US012777184B2

(12) United States Patent
Chen et al.

(10) Patent No.: US 12,777,184 B2
(45) Date of Patent: Oct. 27, 2026

(54) METHOD AND APPARATUS FOR FACE VIDEO COMPRESSION

(71) Applicant: VDT IP PROTECTION LLC, Sioux Falls, SD (US)

(72) Inventors: Bolin Chen, Beijing (CN); Zhao Wang, Beijing (CN); Yan Ye, San Diego, CA (US); Shiqi Wang, Kowloon Tong (HK)

(73) Assignee: Alibaba (China) Co., Ltd., Hangzhou (CN)

( * ) Notice: Subject to any disclaimer, the term of this patent is extended or adjusted under 35 U.S.C. 154(b) by 59 days.

(21) Appl. No.: 18/408,100

(22) Filed: Jan. 9, 2024

(65) Prior Publication Data

US 2024/0251098 A1 Jul. 25, 2024

Related U.S. Application Data

(60) Provisional application No. 63/480,568, filed on Jan. 19, 2023.

(51) Int. Cl.

| | |
|---|---|
| ***G06V 40/20*** | (2022.01) |
| ***G06T 17/20*** | (2006.01) |
| ***G06T 19/20*** | (2011.01) |
| ***G06V 10/766*** | (2022.01) |
| ***G06V 10/77*** | (2022.01) |
| ***G06V 20/40*** | (2022.01) |
| ***G06V 40/16*** | (2022.01) |
| ***H04N 19/543*** | (2014.01) |
| ***H04N 19/587*** | (2014.01) |

(52) U.S. Cl.
CPC ........... *H04N 19/543* (2014.11); *G06T 17/20* (2013.01); *G06T 19/20* (2013.01); *G06V 10/766* (2022.01); *G06V 10/7715* (2022.01); *G06V 20/41* (2022.01); *G06V 40/176* (2022.01); *G06V 40/20* (2022.01); *H04N 19/587* (2014.11); *G06T 2219/2021* (2013.01)

(58) Field of Classification Search
CPC .... G06V 10/7715; G06V 40/20; G06V 20/41; G06T 19/20
USPC .................................................... 375/240.08
See application file for complete search history.

(56) References Cited

U.S. PATENT DOCUMENTS

2014/0185924 A1 7/2014 Cao et al.
2017/0256098 A1 9/2017 Yumer
(Continued)

FOREIGN PATENT DOCUMENTS

CN 113542758 A * 10/2021 ............ G06N 3/045
CN 113963397 A 1/2022

OTHER PUBLICATIONS

Balle et al.,"End-To-End Optimized Image Compression," ICLR, 27 pages, 2017.

(Continued)

*Primary Examiner* — Jeffery A Williams
(74) *Attorney, Agent, or Firm* — Finnegan, Henderson, Farabow, Garrett & Dunner, LLP

(57) ABSTRACT

A method of encoding a video sequence into a bitstream includes receiving a video sequence; encoding one or more pictures of the video sequence; and generating a bitstream. The encoding includes compressing a reference picture; transforming, based on the reference picture, a plurality of inter pictures associated with the reference picture into facial semantics; and encoding the facial semantics.

18 Claims, 21 Drawing Sheets

700

(56) References Cited

U.S. PATENT DOCUMENTS

| | | | | |
|---|---|---|---|---|
| 2017/0286759 | A1 | 10/2017 | Yao et al. | |
| 2018/0068178 | A1* | 3/2018 | Theobalt | G06T 13/40 |
| 2019/0332846 | A1* | 10/2019 | Wu | G06T 7/55 |
| 2024/0144568 | A1* | 5/2024 | Gururani | G06N 3/045 |

OTHER PUBLICATIONS

Baltrusaitis et al., "OpenFace 2.0: Facial Behavior Analysis Toolkit," 13th IEEE International Conference on Automatic Face & Gesture Recognition, pp. 59-66, 2018.
Blanz et al., "A morphable model for the synthesis of 3d faces," in Proceedings of the 26th annual conference on Computer graphics and interactive techniques, 1999, pp. 187-194.
Bross et al., "Overview of the Versatile Video Coding (VVC) Standard and Its Applications," IEEE Transactions on Circuits and Systems for Video Technology, vol. 31, No. 10, pp. 3736-3764, 2021.
Chen et al., "Beyond key-point coding: Temporal evolution inference with compact feature representation for talking face video compression," in Proceedings of the IEEE Data Compression Conference, 10 pages, 2022.
Goodfellow et al., "Generative adversarial nets," Advances in neural information processing systems, vol. 27, 9 pages, 2014.
Lopez et al., "Head pose computation for very low bitrate video coding," in International Conference on Computer Analysis of Images and Patterns. Springer, 1995, pp. 440-447.
Lu et al. "DVC: An end-to-end deep video compression framework," In Proceedings of the IEEE Conference on Computer Vision and Pattern Recognition, pp. 11006-11015, 2019.
Park et al., "Semantic Image Synthesis with Spatially-Adaptive Normalization," Proceedings of the IEEE Conference on Computer Vision and Pattern Recognition, pp. 2337-2346, 2019.
Ronneberger et al., "U-net: Convolutional networks for biomedical image segmentation," in Medical Image Computing and Computer-Assisted Intervention, 8 pages, 2015.
Siarohin et al., "First Order Motion Model for Image Animation," Advances in Neural Information Processing Systems, vol. 32, pp. 7137-7147, 2019.
Sullivan et al., "Overview of the High Efficiency Video Coding (HEVC) Standard," IEE Transactions on Circuits and Systems for Video Technology, vol. 22, No. 12, pp. 1649-1668 (2012).
Wang et al., "One-shot free-view neural talking-head synthesis for video conferencing," in Proceedings of the IEEE/CVFConference on Computer Vision and Pattern Recognition, 2021, pp. 10039-10049.
Wang et al., "Towards Real-World Blind Face Restoration with Generative Facial Prior," The IEEE Conference on Computer Vision and Pattern Recognition (CVPR), pp. 9168-9178, 2021.
Wiegand et al., "Overview of the H.264/AVC Video Coding Standard," IEEE Transactions on Circuitds and Systems for Video Technology, vol. 13, No. 7, Jul. 2003, pp. 560-576.
Zhang et al., "Weakly-Supervised Multi-Face 3D Reconstruction," arXiv: Computer Vision and Pattern Recognition, 2021, 9 pages.
PCT International Search Report and Written Opinion mailed Apr. 22, 2024, issued in corresponding International Application No. PCT/CN2024/072395 (8 pgs.).

* cited by examiner

500B

METHOD AND APPARATUS FOR FACE VIDEO COMPRESSION

CROSS-REFERENCE TO RELATED APPLICATIONS

The disclosure claims the benefits of priority to U.S. Provisional Application No. 63/480,568, filed Jan. 19, 2023, which is incorporated herein by reference in its entirety.

TECHNICAL FIELD

The present disclosure generally relates to video processing, and more particularly, to methods and apparatuses for face video compression.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a method of encoding a video sequence into a bitstream. The method includes receiving a video sequence; encoding one or more pictures of the video sequence; and generating a bitstream. The encoding includes compressing a reference picture; transforming, based on the reference picture, a plurality of inter pictures associated with the reference picture into facial semantics; and encoding the facial semantics.

Embodiments of the present disclosure provide a method of decoding a bitstream to output one or more pictures for a video stream. The method includes receiving a bitstream; and decoding, using facial semantics in the bitstream, one or more pictures. The decoding includes reconstructing a three-dimensional (3D) mesh based on the facial semantics; and generating the one or more pictures based on the reconstructed reference frame and facial semantics.

Embodiments of the present disclosure provide a non-transitory computer readable storage medium storing a bitstream of a video. The bitstream includes an encoded reference picture; and encoded facial semantics of a plurality of inter frames, wherein the facial semantics are determined based on the reference frame and the plurality of inter frames.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
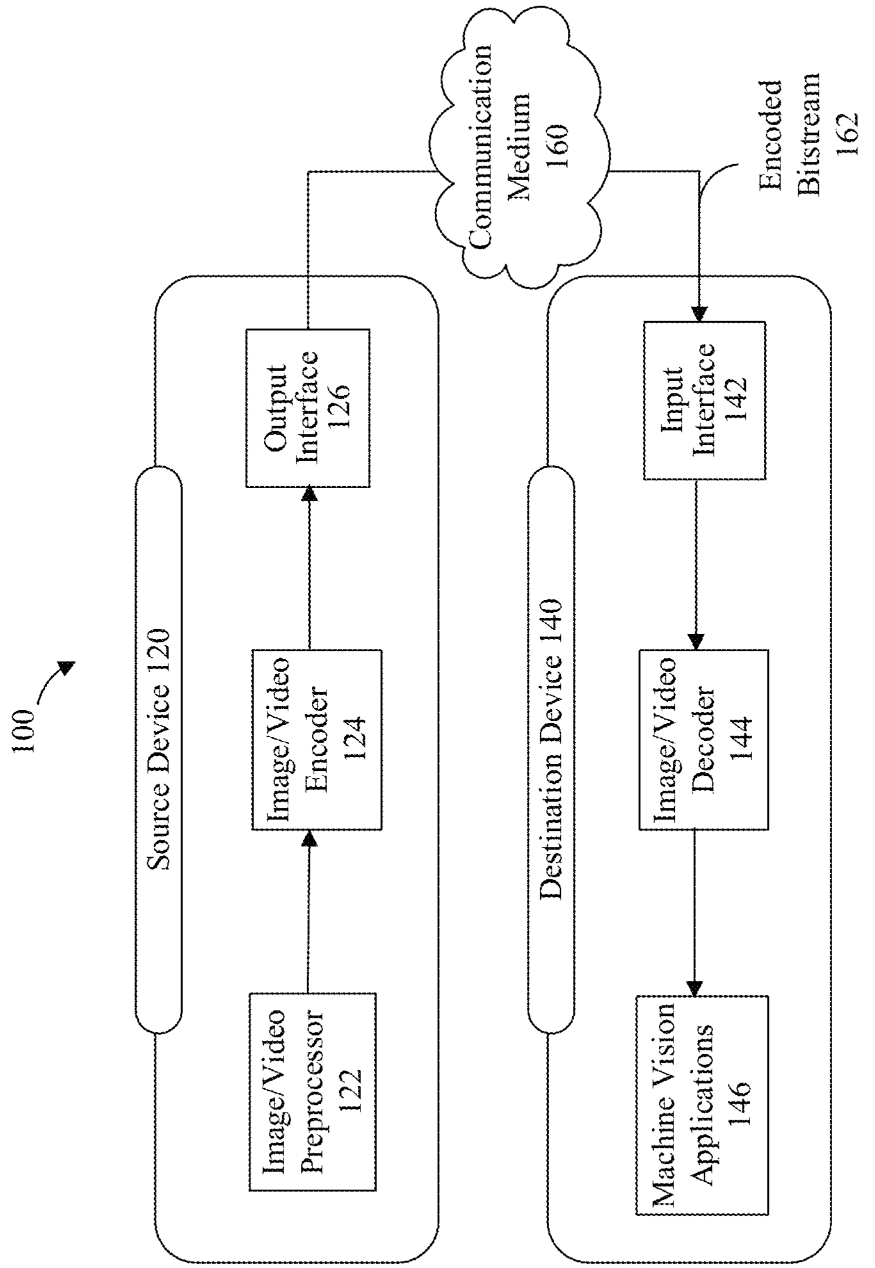
FIG. 1 is a schematic diagram illustrating an exemplary system for coding image data, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recently and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIG. 1 is a block diagram illustrating a system 100 for coding image data, according to some disclosed embodiments. The image data may include an image (also called a "picture" or "frame"), multiple images, or a video. An image is a static picture. Multiple images may be related or unrelated, either spatially or temporary. A video is a set of images arranged in a temporal sequence.

As shown in FIG. 1, system 100 includes a source device 120 that provides encoded video data to be decoded at a later time by a destination device 140. Consistent with the disclosed embodiments, each of source device 120 and destination device 140 may include any of a wide range of devices, including a desktop computer, a notebook (e.g., laptop) computer, a server, a tablet computer, a set-top box, a mobile phone, a vehicle, a camera, an image sensor, a robot, a television, a camera, a wearable device (e.g., a smart watch or a wearable camera), a display device, a digital media player, a video gaming console, a video streaming device, or the like. Source device 120 and destination device 140 may be equipped for wireless or wired communication.

Referring to FIG. 1, source device 120 may include an image/video preprocessor 122, an image/video encoder 124, and an output interface 126. Destination device 140 may include an input interface 142, an image/video decoder 144, and machine vision applications 146. Image/video encoder 124 encodes the input bitstream and outputs an encoded bitstream 162 via output interface 126. Encoded bitstream 162 is transmitted through a communication medium 160, and received by input interface 142. Image/video decoder 144 then decodes encoded bitstream 162 to generate decoded data.

More specifically, source device 120 may further include various devices (not shown) for providing source image data to be processed by Image/video encoder 124. The devices for providing the source image data may include an image/video capture device, such as a camera, an image/video archive or storage device containing previously captured images/videos, or an image/video feed interface to receive images/videos from an image/video content provider.

Image/video encoder 124 and image/video decoder 144 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware, or any combinations thereof. When the encoding or decoding is implemented partially in software, image/video encoder 124 or image/video decoder 144 may store instructions for the software in a suitable, non-transitory computer-readable medium and execute the instructions in hardware using one or more processors to perform the techniques consistent this disclosure. Each of image/video encoder 124 or image/video decoder 144 may be included in one or more encoders or decoders, either of which may be integrated as part of a combined encoder/decoder (CODEC) in a respective device.

Image/video encoder 124 and image/video decoder 144 may operate according to any video coding standard, such as Advanced Video Coding (AVC), High Efficiency Video Coding (HEVC), Versatile Video Coding (VVC), AOMedia Video 1 (AV1), Joint Photographic Experts Group (JPEG), Moving Picture Experts Group (MPEG), etc. Alternatively, image/video encoder 124 and image/video decoder 144 may be customized devices that do not comply with the existing standards. Although not shown in FIG. 1, in some embodiments, image/video encoder 124 and image/video decoder 144 may each be integrated with an audio encoder and decoder, and may include appropriate MUX-DEMUX units, or other hardware and software, to handle encoding of both audio and video in a common data stream or separate data streams.

Output interface 126 may include any type of medium or device capable of transmitting encoded bitstream 162 from source device 120 to destination device 140. For example, output interface 126 may include a transmitter or a transceiver configured to transmit encoded bitstream 162 from source device 120 directly to destination device 140 in real-time. Encoded bitstream 162 may be modulated according to a communication standard, such as a wireless communication protocol, and transmitted to destination device 140.

Communication medium 160 may include transient media, such as a wireless broadcast or wired network transmission. For example, communication medium 160 may include a radio frequency (RF) spectrum or one or more physical transmission lines (e.g., a cable). Communication medium 160 may form part of a packet-based network, such as a local area network, a wide-area network, or a global network such as the Internet. In some embodiments, communication medium 160 may include routers, switches, base stations, or any other equipment that may be useful to facilitate communication from source device 120 to destination device 140. For example, a network server (not shown) may receive encoded bitstream 162 from source device 120 and provide encoded bitstream 162 to destination device 140, e.g., via network transmission.

Communication medium 160 may also be in the form of a storage media (e.g., non-transitory storage media), such as a hard disk, flash drive, compact disc, digital video disc, Blu-ray disc, volatile or non-volatile memory, or any other suitable digital storage media for storing encoded image data. In some embodiments, a computing device of a medium production facility, such as a disc stamping facility, may receive encoded image data from source device 120 and produce a disc containing the encoded video data.

Input interface 142 may include any type of medium or device capable of receiving information from communication medium 160. The received information includes encoded bitstream 162. For example, input interface 142 may include a receiver or a transceiver configured to receive encoded bitstream 162 in real-time.

System 100 can be configured to performing video encoding and decoding based on block-based video compression techniques, deep learning based video compression techniques, talking face video compression techniques, etc.

The block-based video compression techniques use a block-based hybrid video coding framework to exploit the spatial redundancy, temporal redundancy, and information entropy redundancy in videos. This hybrid video coding framework includes motion compensation (e.g., intra/inter prediction), transform (e.g., discrete cosine transform), quantization and entropy coding. The block-based video compression techniques can be made compliant with various image/video coding standards, such as JPEG, JPEG2000, the H.264/MPEG4 part 10, Audio Video coding Standard (AVS), the H.265/HEVC standard, the Versatile Video Coding (VVC) standard, etc.

Figure 2:
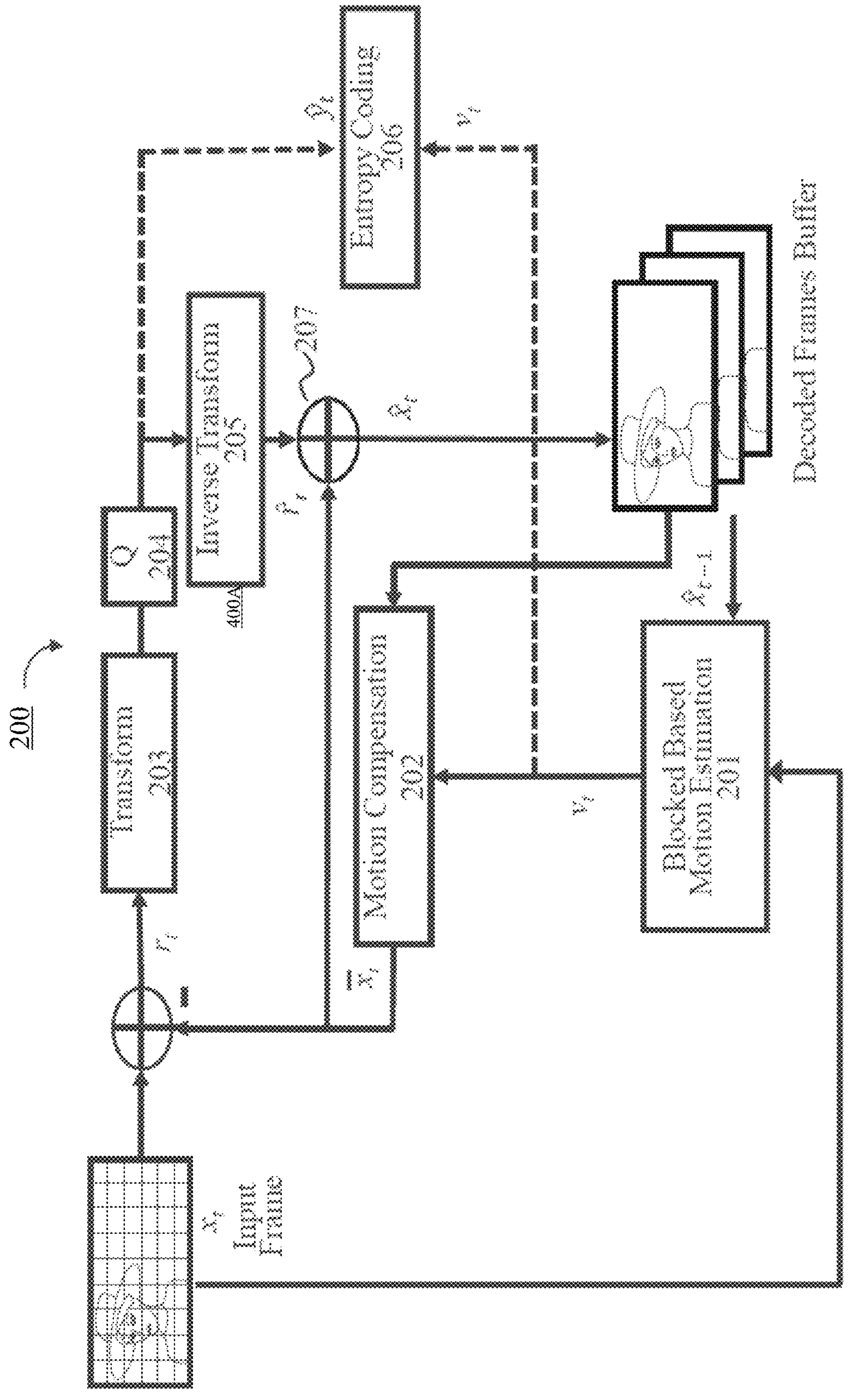
FIG. 2 is a schematic diagram illustrating an architecture of a block-based video compression framework, according to some embodiments of the present disclosure.

FIG. 2 is a schematic diagram illustrating a block-based video compression framework 200, according to some embodiments of the present disclosure. Block-based video compression framework 200 can include an encoder configured to generate bitstreams based on input video frames, and a decoder configured to reconstruct video frames based on the bitstreams. For simplicity, FIG. 2 only shows the encoder side of block-based video compression framework 200. It is contemplated that the decoder side of block-based video compression framework 200 reverses the operations at the encoder side.

Specifically, as shown in FIG. 2, the input frame $x_t$ of the encoder side is split into a set of blocks, e.g., square regions, of the same size (e.g., 8×8). The block-based video compression framework 200 includes the following steps.

Block-based video compression framework 200 performs motion estimation by using a block based motion estimation module 201. The motion estimation module 201 can estimate the motion between the current frame $x_t$ and the previous reconstructed frame $\hat{x}_{t-1}$. The corresponding motion vector $v_t$ for each block is obtained.

Block-based video compression framework 200 performs motion compensation by using a motion compensation module 202. The predicted frame $\bar{x}_t$ is obtained by copying the corresponding pixels in the previous reconstructed frame to the current frame based on the motion vector $v_t$ determined by motion estimation module 201. Then, the residual $r_t$ between the original frame $x_t$ and the predicted frame $\bar{x}_t$ is obtained as $r_t=x_t-\bar{x}_t$.

Block-based video compression framework 200 performs transform and quantization by using a transform module 203 and a Q module 204, respectively. The residual $r_t$ is quantized to $\hat{y}_t$ by Q module 204. A linear transform (e.g., DCT)

is used before quantization by transform module 203 for better compression performance.

Block-based video compression framework 200 performs inverse transform by using an inverse transform module 205. The quantized result $\hat{y}_t$ is used by inverse transform for obtaining the reconstructed residual $\hat{r}_t$.

Block-based video compression framework 200 performs entropy coding by using an entropy coding module 206. Both the motion vector $v_t$ and the quantized result $\hat{y}_t$ are encoded into one or more bitstreams by the entropy coding method and sent to the decoder.

Block-based video compression framework 200 performs frame reconstruction by using a reconstruction module 207. The reconstructed frame $\hat{x}_t$ is obtained by adding $\bar{x}_t$ and $\hat{r}_t$, i.e., $\hat{x}_t=\hat{r}_t+\bar{x}_t$. The reconstructed frame will be used by the $(t+1)_{th}$ frame for motion estimation.

The bitstreams generated by entropy coding module 206 can be decoded at the decoder side (not shown in FIG. 2). Motion compensation, inverse quantization, and frame reconstruction can be performed to obtain the reconstructed frame $\hat{x}_t$.

Figure 3:
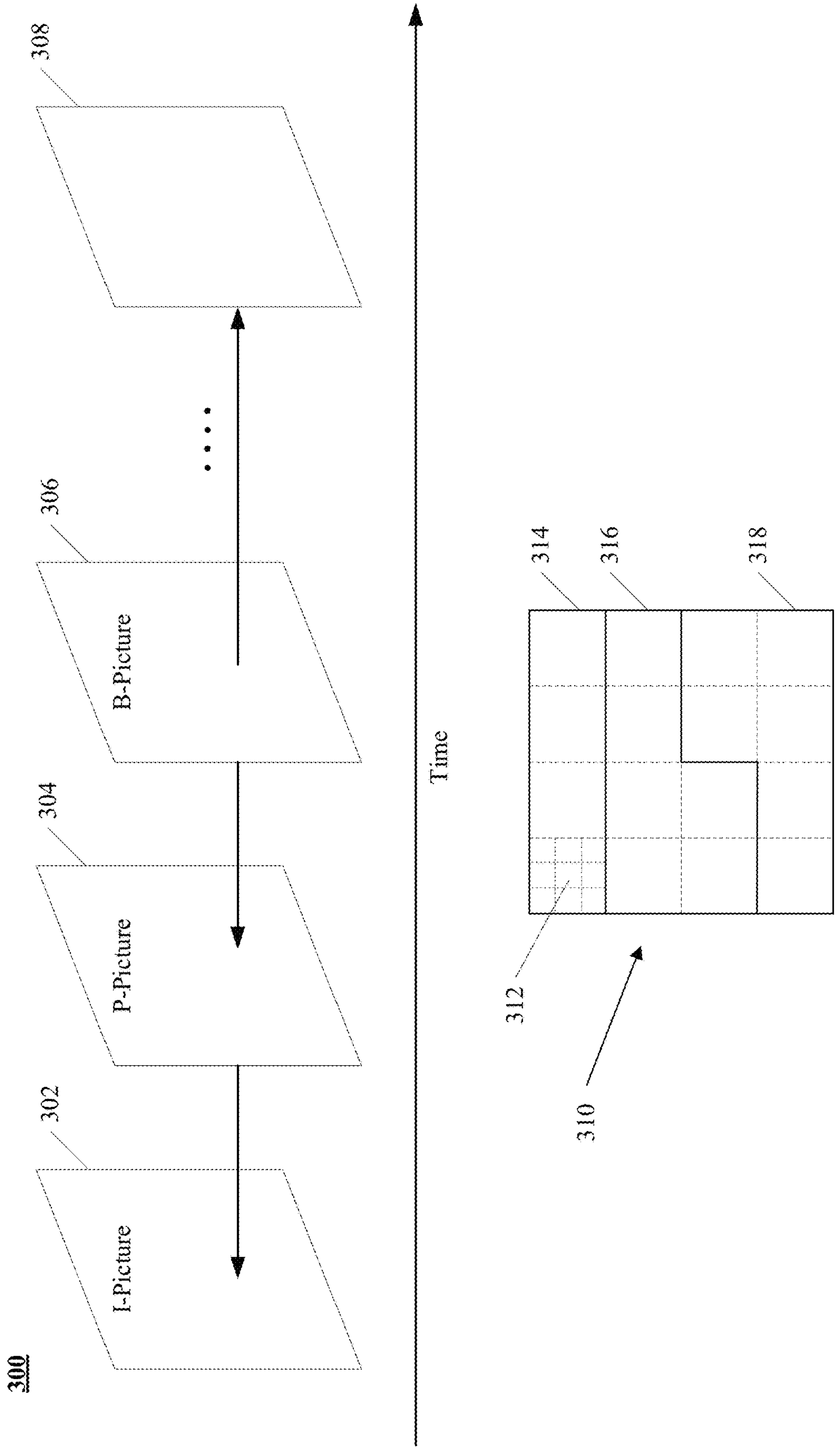
FIG. 3 is a schematic diagram illustrating structures of an example video sequence, according to some embodiments of the present disclosure.

The details of block-based video compression framework 200 are further described in connection with FIGS. 3, 4A, 4B, 5A, and 5B. Specifically, FIG. 3 illustrates structures of an example video sequence 300, according to some embodiments of the present disclosure. Video sequence 300 can be a live video or a video having been captured and archived. Video 300 can be a real-life video, a computer-generated video (e.g., computer game video), or a combination thereof (e.g., a real-life video with augmented-reality effects). Video sequence 300 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 3, video sequence 300 can include a series of pictures arranged temporally along a timeline, including pictures 302, 304, 306, and 308. Pictures 302-306 are continuous, and there are more pictures between pictures 306 and 308. In FIG. 3, picture 302 is an I-picture, the reference picture of which is picture 302 itself. Picture 304 is a P-picture, the reference picture of which is picture 302, as indicated by the arrow. Picture 306 is a B-picture, the reference pictures of which are pictures 304 and 308, as indicated by the arrows. In some embodiments, the reference picture of a picture (e.g., picture 304) can be not immediately preceding or following the picture. For example, the reference picture of picture 304 can be a picture preceding picture 302. It should be noted that the reference pictures of pictures 302-306 are only examples, and the present disclosure does not limit embodiments of the reference pictures as the examples shown in FIG. 3.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 310 in FIG. 3 shows an example structure of a picture of video sequence 300 (e.g., any of pictures 302-308). In structure 310, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC, H.266/VVC, or AVS). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC, H.266/VVC or AVS). Any operation performed to a basic processing unit can be repeatedly performed to each of its luma and chroma components.

Video coding has multiple stages of operations, examples of which are shown in FIGS. 4A-4B and FIGS. 5A-5B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, H.264/AVC, or AVS), or as "coding units" ("CUs") in some other video coding standards (e.g., H.265/HEVC, H.266/VVC, or AVS). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 4A:
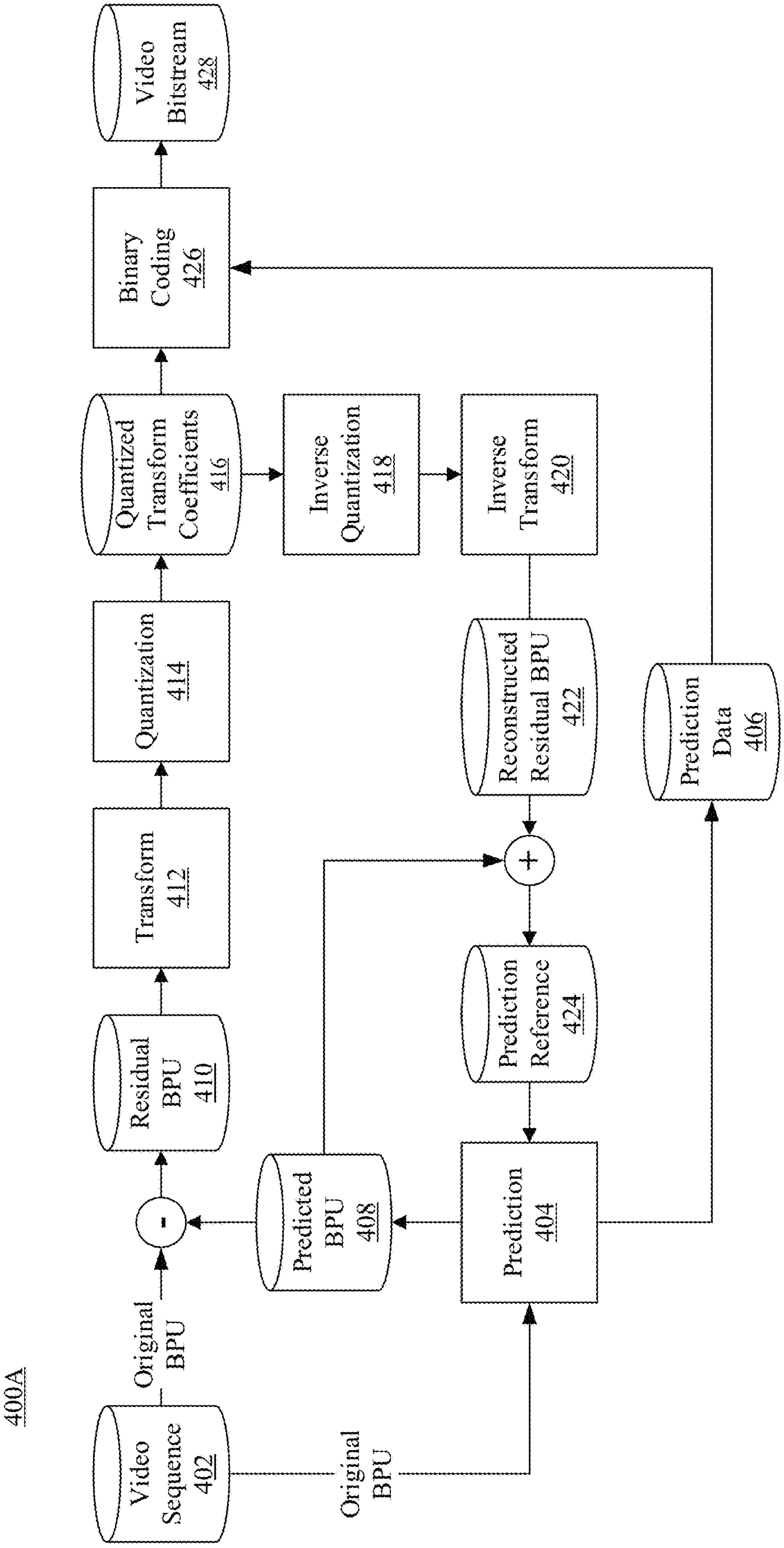
FIG. 4A is a schematic diagram illustrating an exemplary block-based encoding process, according to some embodiments of the present disclosure.
Figure 4B:
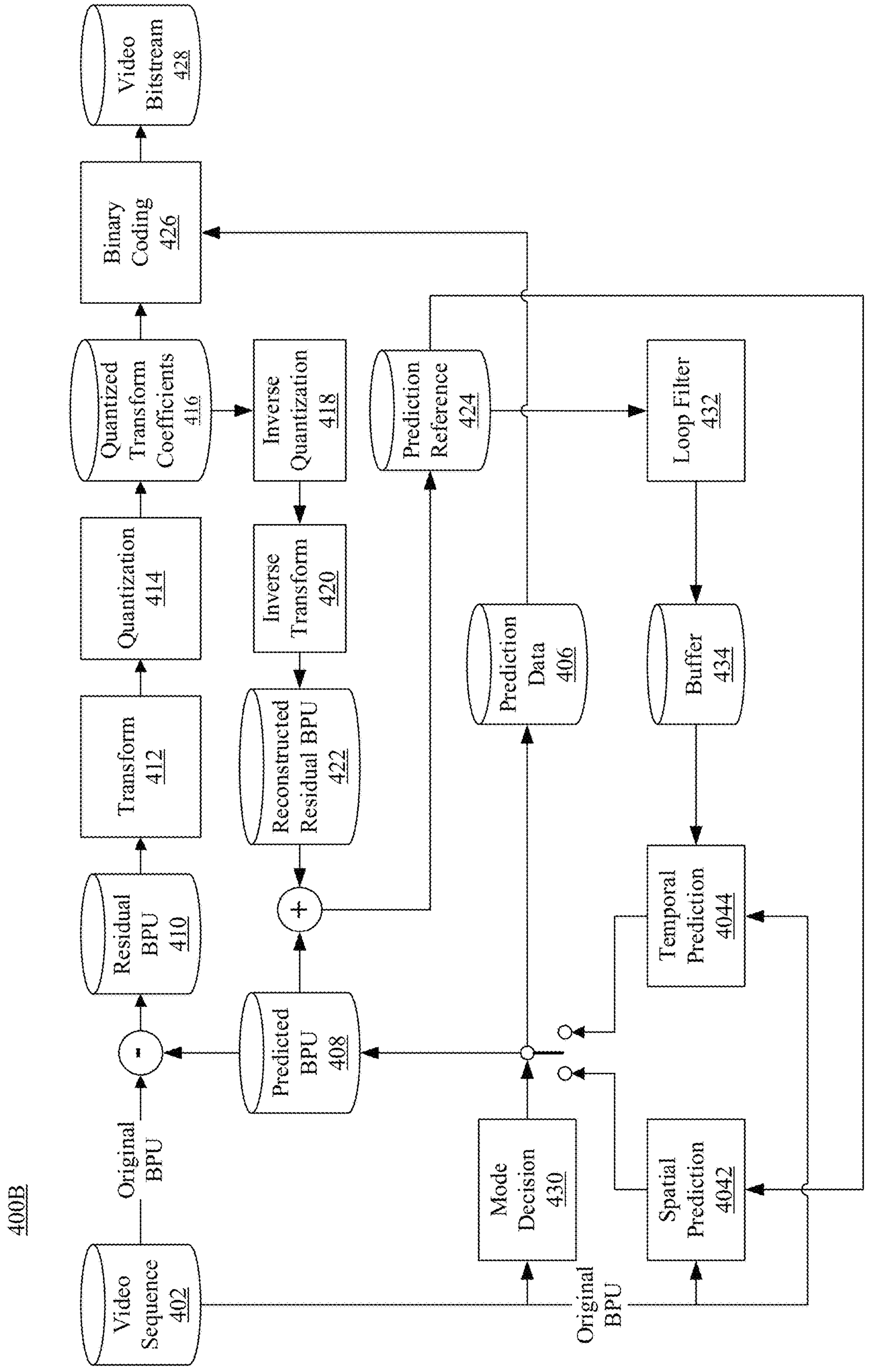
FIG. 4B is a schematic diagram illustrating another exemplary block-based encoding process, according to some embodiments of the present disclosure.

For example, at a mode decision stage (an example of which is shown in FIG. 4B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC, H.266/VVC, or AVS), and decide a prediction type for each individual basic processing sub-unit.

For another example, at a prediction stage (an example of which is shown in FIGS. 4A-4B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC, H.266/VVC, or AVS), at the level of which the prediction operation can be performed.

For another example, at a transform stage (an example of which is shown in FIGS. 4A-4B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC, H.266/VVC, or AVS), at the level of which the transform operation can be performed. It should be noted that the division schemes of the same basic processing sub-unit can be different at the prediction stage and the transform stage. For example, in H.265/HEVC, H.266/VVC, or AVS, the prediction blocks and transform blocks of the same CU can have different sizes and numbers.

In structure 310 of FIG. 3, basic processing unit 312 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC, H.266/VVC and AVS provide two types of regions: "slices" and "tiles." It should also be noted that different pictures of video sequence 300 can have different partition schemes for dividing a picture into regions.

For example, in FIG. 3, structure 310 is divided into three regions 314, 316, and 318, the boundaries of which are shown as solid lines inside structure 310. Region 314 includes four basic processing units. Each of regions 316 and 318 includes six basic processing units. It should be noted that the basic processing units, basic processing sub-units, and regions of structure 310 in FIG. 3 are only examples, and the present disclosure does not limit embodiments thereof.

FIG. 4A illustrates a schematic diagram of an example encoding process 400A, consistent with embodiments of the disclosure. For example, the encoding process 400A can be performed by an encoder. As shown in FIG. 4A, the encoder can encode video sequence 402 into video bitstream 428 according to process 400A. Similar to video sequence 300 in FIG. 3, video sequence 402 can include a set of pictures (referred to as "original pictures") arranged in a temporal order. Similar to structure 310 in FIG. 3, each original picture of video sequence 402 can be divided by the encoder into basic processing units, basic processing sub-units, or regions for processing. In some embodiments, the encoder can perform process 400A at the level of basic processing units for each original picture of video sequence 402. For example, the encoder can perform process 400A in an iterative manner, in which the encoder can encode a basic processing unit in one iteration of process 400A. In some embodiments, the encoder can perform process 400A in parallel for regions (e.g., regions 314-318) of each original picture of video sequence 402.

In FIG. 4A, the encoder can feed a basic processing unit (referred to as an "original BPU") of an original picture of video sequence 402 to prediction stage 404 to generate prediction data 406 and predicted BPU 408. The encoder can subtract predicted BPU 408 from the original BPU to generate residual BPU 410. The encoder can feed residual BPU 410 to transform stage 412 and quantization stage 414 to generate quantized transform coefficients 416. The encoder can feed prediction data 406 and quantized transform coefficients 416 to binary coding stage 426 to generate video bitstream 428. Components 402, 404, 406, 408, 410, 412, 414, 416, 426, and 428 can be referred to as a "forward path." During process 400A, after quantization stage 414, the encoder can feed quantized transform coefficients 416 to inverse quantization stage 418 and inverse transform stage 420 to generate reconstructed residual BPU 422. The encoder can add reconstructed residual BPU 422 to predicted BPU 408 to generate prediction reference 424, which is used in prediction stage 404 for the next iteration of process 400A. Components 418, 420, 422, and 424 of process 400A can be referred to as a "reconstruction path." The reconstruction path can be used to ensure that both the encoder and the decoder use the same reference data for prediction.

The encoder can perform process 400A iteratively to encode each original BPU of the original picture (in the forward path) and generate predicted reference 424 for encoding the next original BPU of the original picture (in the reconstruction path). After encoding all original BPUs of the original picture, the encoder can proceed to encode the next picture in video sequence 402.

Referring to process 400A, the encoder can receive video sequence 402 generated by a video capturing device (e.g., a camera). The term "receive" used herein can refer to receiving, inputting, acquiring, retrieving, obtaining, reading, accessing, or any action in any manner for inputting data.

At prediction stage 404, at a current iteration, the encoder can receive an original BPU and prediction reference 424, and perform a prediction operation to generate prediction data 406 and predicted BPU 408. Prediction reference 424 can be generated from the reconstruction path of the previous iteration of process 400A. The purpose of prediction stage 404 is to reduce information redundancy by extracting prediction data 406 that can be used to reconstruct the original BPU as predicted BPU 408 from prediction data 406 and prediction reference 424.

Ideally, predicted BPU 408 can be identical to the original BPU. However, due to non-ideal prediction and reconstruction operations, predicted BPU 408 is generally slightly different from the original BPU. For recording such differences, after generating predicted BPU 408, the encoder can subtract it from the original BPU to generate residual BPU 410. For example, the encoder can subtract values (e.g., greyscale values or RGB values) of pixels of predicted BPU 408 from values of corresponding pixels of the original BPU. Each pixel of residual BPU 410 can have a residual value as a result of such subtraction between the corresponding pixels of the original BPU and predicted BPU 408. Compared with the original BPU, prediction data 406 and residual BPU 410 can have fewer bits, but they can be used to reconstruct the original BPU without significant quality deterioration. Thus, the original BPU is compressed.

To further compress residual BPU 410, at transform stage 412, the encoder can reduce spatial redundancy of residual BPU 410 by decomposing it into a set of two-dimensional "base patterns," each base pattern being associated with a "transform coefficient." The base patterns can have the same size (e.g., the size of residual BPU 410). Each base pattern can represent a variation frequency (e.g., frequency of brightness variation) component of residual BPU 410. None of the base patterns can be reproduced from any combinations (e.g., linear combinations) of any other base patterns. In other words, the decomposition can decompose variations of residual BPU 410 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 412, such as, for example, a discrete cosine transform, a discrete sine transform, or the like. The transform at transform stage 412 is invertible. That is, the encoder can restore residual BPU 410 by an inverse operation of the transform (referred to as an "inverse transform"). For example, to restore a pixel of residual BPU 410, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 410 without receiving the base patterns from the encoder. Compared with residual BPU 410, the transform coefficients can have fewer bits, but they can be used to reconstruct residual BPU 410 without significant quality deterioration. Thus, residual BPU 410 is further compressed.

The encoder can further compress the transform coefficients at quantization stage 414. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 414, the encoder can generate quantized transform coefficients 416 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 416, by which the transform coefficients are further compressed. The quantization process is also invertible, in which quantized transform coefficients 416 can be reconstructed to the transform coefficients in an inverse operation of the quantization (referred to as "inverse quantization").

Because the encoder disregards the remainders of such divisions in the rounding operation, quantization stage 414 can be lossy. Typically, quantization stage 414 can contribute the most information loss in process 400A. The larger the information loss is, the fewer bits the quantized transform coefficients 416 can need. For obtaining different levels of information loss, the encoder can use different values of the quantization parameter or any other parameter of the quantization process.

At binary coding stage 426, the encoder can encode prediction data 406 and quantized transform coefficients 416 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 406 and quantized transform coefficients 416, the encoder can encode other information at binary coding stage 426, such as, for example, a prediction mode used at prediction stage 404, parameters of the prediction operation, a transform type at transform stage 412, parameters of the quantization process (e.g., quantization parameters), an encoder control parameter (e.g., a bitrate control parameter), or the like. The encoder can use the output data of binary coding stage 426 to generate video bitstream 428. In some embodiments, video bitstream 428 can be further packetized for network transmission.

Referring to the reconstruction path of process 400A, at inverse quantization stage 418, the encoder can perform inverse quantization on quantized transform coefficients 416 to generate reconstructed transform coefficients. At inverse transform stage 420, the encoder can generate reconstructed residual BPU 422 based on the reconstructed transform coefficients. The encoder can add reconstructed residual BPU 422 to predicted BPU 408 to generate prediction reference 424 that is to be used in the next iteration of process 400A.

It should be noted that other variations of the process 400A can be used to encode video sequence 402. In some embodiments, stages of process 400A can be performed by the encoder in different orders. In some embodiments, one or more stages of process 400A can be combined into a single stage. In some embodiments, a single stage of process 400A can be divided into multiple stages. For example, transform stage 412 and quantization stage 414 can be combined into a single stage. In some embodiments, process 400A can include additional stages. In some embodiments, process 400A can omit one or more stages in FIG. 4A.

FIG. 4B illustrates a schematic diagram of another example encoding process 400B, consistent with embodiments of the disclosure. Process 400B can be modified from process 400A. For example, process 400B can be used by an encoder conforming to a hybrid video coding standard (e.g., H.26x series). Compared with process 400A, the forward path of process 400B additionally includes mode decision stage 430 and divides prediction stage 404 into spatial prediction stage 4042 and temporal prediction stage 4044. The reconstruction path of process 400B additionally includes loop filter stage 432 and buffer 434.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 424 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 424 in the temporal prediction can include the coded pictures. The temporal prediction can reduce the inherent temporal redundancy of the pictures.

Referring to process 400B, in the forward path, the encoder performs the prediction operation at spatial prediction stage 4042 and temporal prediction stage 4044. For example, at spatial prediction stage 4042, the encoder can perform the intra prediction. For an original BPU of a picture being encoded, prediction reference 424 can include one or more neighboring BPUs that have been encoded (in the forward path) and reconstructed (in the reconstructed path) in the same picture. The encoder can generate predicted BPU 408 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 408. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 406 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 4044, the encoder can perform the inter prediction. For an original BPU of a current picture, prediction reference 424 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 422 to predicted BPU 408 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 3), it can be deemed that the matching region "moves" to the location of the original BPU as time goes by. The encoder can record the direction and distance of such a motion as a "motion vector." When multiple reference pictures are used (e.g., as picture 306 in FIG. 3), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 406 can include, for example, locations (e.g., coordinates) of the matching region, the motion vectors associated with the matching region, the number of reference pictures, weights associated with the reference pictures, or the like.

For generating predicted BPU 408, the encoder can perform an operation of "motion compensation." The motion compensation can be used to reconstruct predicted BPU 408 based on prediction data 406 (e.g., the motion vector) and prediction reference 424. For example, the encoder can move the matching region of the reference picture according to the motion vector, in which the encoder can predict the original BPU of the current picture. When multiple reference pictures are used (e.g., as picture 306 in FIG. 3), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 304 in FIG. 3 is a unidirectional inter-predicted picture, in which the reference picture (e.g., picture 302) precedes picture 304. Bidirectional inter predictions can use one or more reference pictures at both temporal directions with respect to the current picture. For example, picture 306 in FIG. 3 is a bidirectional inter-predicted picture, in which the reference pictures (e.g., pictures 304 and 308) are at both temporal directions with respect to picture 304.

Still referring to the forward path of process 400B, after spatial prediction 4042 and temporal prediction stage 4044, at mode decision stage 430, the encoder can select a prediction mode (e.g., one of the intra prediction or the inter prediction) for the current iteration of process 400B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 408 and predicted data 406.

In the reconstruction path of process 400B, if intra prediction mode has been selected in the forward path, after generating prediction reference 424 (e.g., the current BPU that has been encoded and reconstructed in the current picture), the encoder can directly feed prediction reference 424 to spatial prediction stage 4042 for later usage (e.g., for extrapolation of a next BPU of the current picture). The encoder can feed prediction reference 424 to loop filter stage 432, at which the encoder can apply a loop filter to prediction reference 424 to reduce or eliminate distortion (e.g., blocking artifacts) introduced during coding of the prediction reference 424. The encoder can apply various loop filter techniques at loop filter stage 432, such as, for example, deblocking, sample adaptive offsets, adaptive loop filters, or the like. The loop-filtered reference picture can be stored in buffer 434 (or "decoded picture buffer") for later use (e.g., to be used as an inter-prediction reference picture for a future picture of video sequence 402). The encoder can store one or more reference pictures in buffer 434 to be used at temporal prediction stage 4044. In some embodiments, the encoder can encode parameters of the loop filter (e.g., a loop filter strength) at binary coding stage 426, along with quantized transform coefficients 416, prediction data 406, and other information.

Figure 5A:
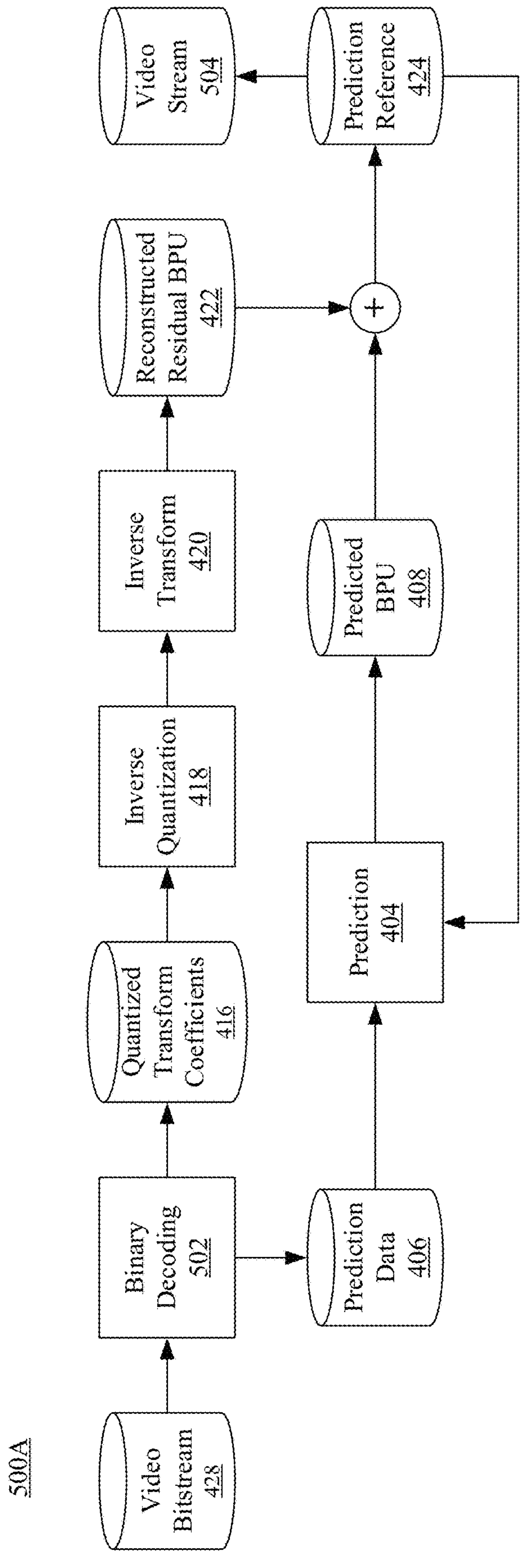
FIG. 5A is a schematic diagram illustrating an exemplary block-based decoding process, according to some embodiments of the present disclosure.

FIG. 5A illustrates a schematic diagram of an example decoding process 500A, consistent with embodiments of the disclosure. Process 500A can be a decompression process corresponding to the compression process 400A in FIG. 4A. In some embodiments, process 500A can be similar to the reconstruction path of process 400A. A decoder can decode video bitstream 428 into video stream 504 according to process 500A. Video stream 504 can be very similar to video sequence 402. However, due to the information loss in the compression and decompression process (e.g., quantization stage 414 in FIGS. 4A-4B), generally, video stream 504 is not identical to video sequence 402. Similar to processes 400A and 400B in FIGS. 4A-4B, the decoder can perform process 500A at the level of basic processing units (BPUs) for each picture encoded in video bitstream 428. For example, the decoder can perform process 500A in an iterative manner, in which the decoder can decode a basic processing unit in one iteration of process 500A. In some embodiments, the decoder can perform process 500A in parallel for regions (e.g., regions 314-318) of each picture encoded in video bitstream 428.

In FIG. 5A, the decoder can feed a portion of video bitstream 428 associated with a basic processing unit (referred to as an "encoded BPU") of an encoded picture to binary decoding stage 502. At binary decoding stage 502, the decoder can decode the portion into prediction data 406 and quantized transform coefficients 416. The decoder can feed quantized transform coefficients 416 to inverse quantization stage 418 and inverse transform stage 420 to generate reconstructed residual BPU 422. The decoder can feed prediction data 406 to prediction stage 404 to generate predicted BPU 408. The decoder can add reconstructed residual BPU 422 to predicted BPU 408 to generate predicted reference 424. In some embodiments, predicted reference 424 can be stored in a buffer (e.g., a decoded picture buffer in a computer memory). The decoder can feed predicted reference 424 to prediction stage 404 for performing a prediction operation in the next iteration of process 500A.

The decoder can perform process 500A iteratively to decode each encoded BPU of the encoded picture and generate predicted reference 424 for encoding the next encoded BPU of the encoded picture. After decoding all encoded BPUs of the encoded picture, the decoder can output the picture to video stream 504 for display and proceed to decode the next encoded picture in video bitstream 428.

At binary decoding stage 502, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 406 and quantized transform coefficients 416, the decoder can decode other information at binary decoding stage 502, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 428 is transmitted over a network in packets, the decoder can depacketize video bitstream 428 before feeding it to binary decoding stage 502.

Figure 5B:
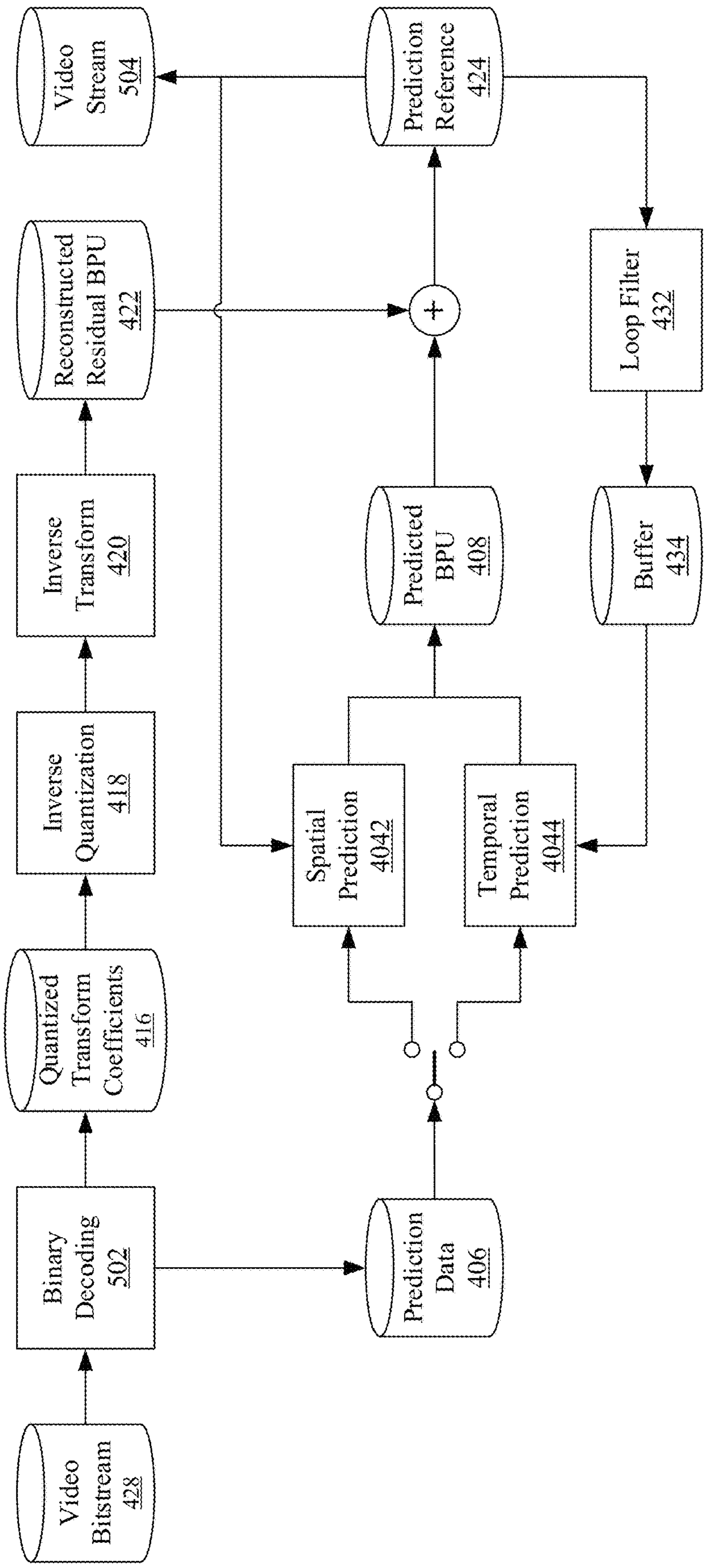
FIG. 5B is a schematic diagram illustrating another exemplary block-based decoding process, according to some embodiments of the present disclosure.

FIG. 5B illustrates a schematic diagram of another example decoding process 500B, consistent with embodiments of the disclosure. Process 500B can be modified from process 500A. For example, process 500B can be used by a decoder conforming to a hybrid video coding standard (e.g., H.26x series). Compared with process 500A, process 500B additionally divides prediction stage 404 into spatial prediction stage 4042 and temporal prediction stage 4044, and additionally includes loop filter stage 432 and buffer 434.

In process 500B, for an encoded basic processing unit (referred to as a "current BPU") of an encoded picture (referred to as a "current picture") that is being decoded, prediction data 406 decoded from binary decoding stage 502 by the decoder can include various types of data, depending on what prediction mode was used to encode the current BPU by the encoder. For example, if intra prediction was used by the encoder to encode the current BPU, prediction data 406 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 406 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 4042 or a temporal prediction (e.g., the inter prediction) at temporal prediction stage 4044. The details of performing such spatial prediction or temporal prediction are described in FIG. 4B and will not be repeated hereinafter. After performing such spatial prediction or temporal prediction, the decoder can generate predicted BPU 408. The decoder can add predicted BPU 408 and reconstructed residual BPU 422 to generate prediction reference 424, as described in FIG. 5A.

In process 500B, the decoder can feed predicted reference 424 to spatial prediction stage 4042 or temporal prediction stage 4044 for performing a prediction operation in the next iteration of process 500B. For example, if the current BPU is decoded using the intra prediction at spatial prediction stage 4042, after generating prediction reference 424 (e.g., the decoded current BPU), the decoder can directly feed prediction reference 424 to spatial prediction stage 4042 for later usage (e.g., for extrapolation of a next BPU of the current picture). If the current BPU is decoded using the inter prediction at temporal prediction stage 4044, after generating prediction reference 424 (e.g., a reference picture in which all BPUs have been decoded), the decoder can feed prediction reference 424 to loop filter stage 432 to reduce or eliminate distortion (e.g., blocking artifacts). The decoder can apply a loop filter to prediction reference 424, in a way as described in FIG. 4B. The loop-filtered reference picture can be stored in buffer 434 (e.g., a decoded picture buffer in a computer memory) for later use (e.g., to be used as an inter-prediction reference picture for a future encoded picture of video bitstream 428). The decoder can store one or more reference pictures in buffer 434 to be used at temporal prediction stage 4044. In some embodiments, prediction data can further include parameters of the loop filter (e.g., a loop filter strength). In some embodiments, prediction data includes parameters of the loop filter when the prediction mode indicator of prediction data 406 indicates that inter prediction was used to encode the current BPU.

In addition to the block-based video compression techniques, deep learning can be used in video compression, to achieve competitive performance compared with traditional compression schemes. For example, end-to-end image compression algorithms show better rate-distortion (RD) performance than JPEG, JPEG2000 and even HEVC due to end-to-end training and non-linear transform. Moreover, the video compression algorithms based on Deep Neural Networks (DNNs), such as deep video compression model (DVC), can achieve promising RD performance. These schemes can work without the prior knowledge of the video content. Regarding the applications of video conferencing/telephone, deep generative models, such as First Order Motion Model (FOMM) and Face Video-to-Video Synthesis (Face_vid2vid), can achieve promising performance at ultra-low bit rate. In particular, these models leverage the fact that the variations of these videos typically lie in the human motion information, providing the strong priors that can be used in frame synthesis. These features are described by the variations of human structures, such as landmarks or key points, and are further conveyed to animate the reference frame and generate the human motion video.

Deep learning-based algorithms can be used to replace or enhance some operations or functions of the block-based video coding tools, including intra/inter prediction, entropy coding, in-loop filtering, etc. Regarding the joint optimization of the entire image/video compression framework rather than designing one particular module, end-to-end image/video compression algorithms can be used. For example, an end-to-end video coding scheme DVC scheme that jointly optimizes all the components for video compression can be used. Furthermore, to address the content adaptive and error propagation aware problems, an online encoder updating scheme can be used to improve the video compression performance. In addition, a FVC by developing all major modules of the end-to-end compression framework in the feature space can be used. Based on recurrent probability model and weighted recurrent quality enhancement network, a Recurrent Learning for Video Compression (RLVC) and HLVC can be used to exploit the temporal correlation among video frames. Four effective modules in Multiple Frames Prediction for Learned Video Compression (M-LVC) can be used. However, like the traditional video coding tools, these learning-based video compression methods aim at the universal natural scenes without the specific consideration of the human content, such as face, body or other parts.

Figure 6:
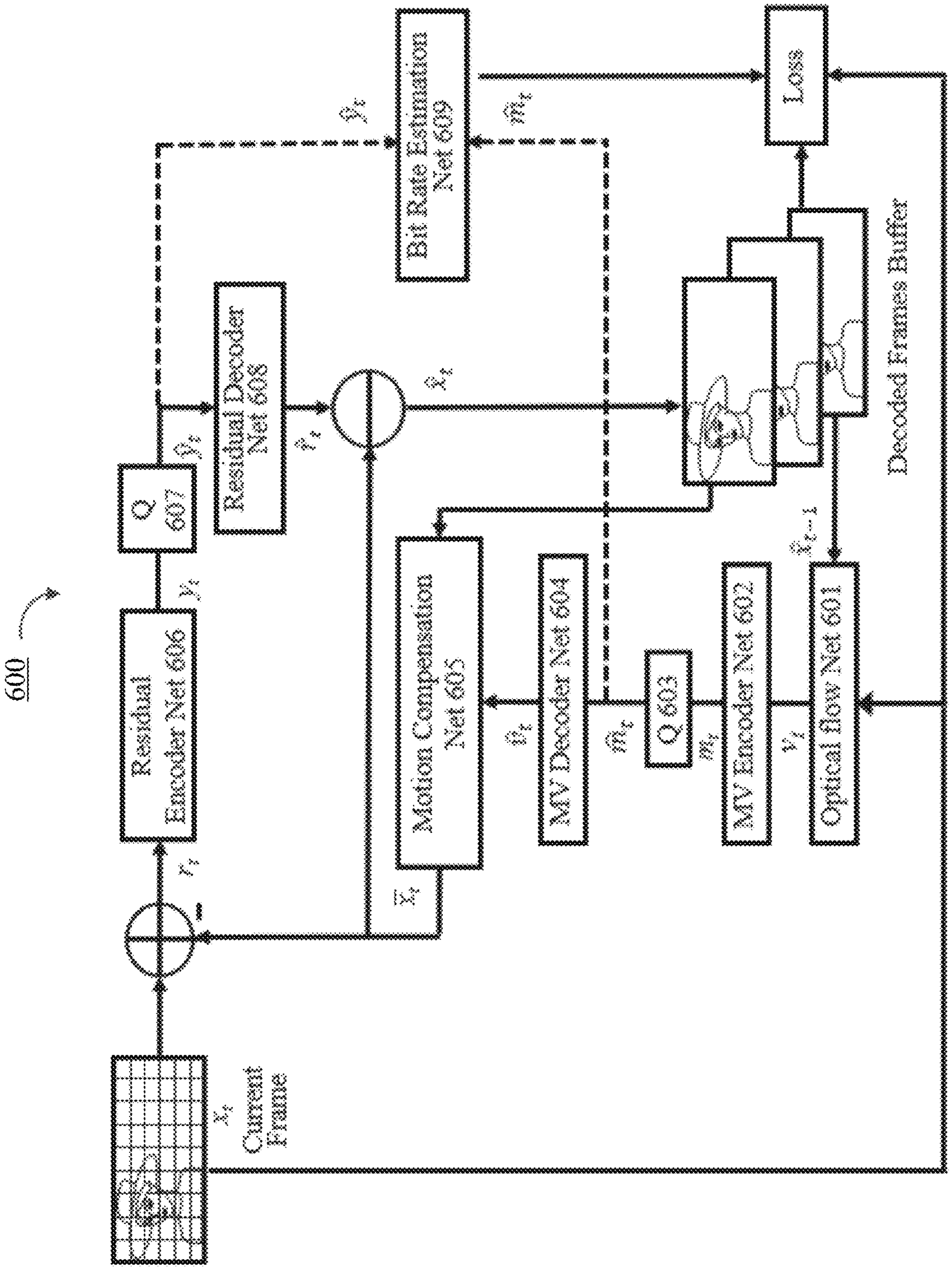
FIG. 6 is a schematic diagram illustrating an exemplary architecture of an end-to-end deep learning based video compression framework, according to some embodiments of the present disclosure.

FIG. 6 is a schematic diagram illustrating an exemplary architecture of an end-to-end deep learning based video compression framework 600, according to some embodiments of the present disclosure. Framework 600 uses various deep learning models that jointly optimize the components of video compression, such as motion estimation, motion compression, and residual compression. Specifically, learning based optical flow estimation is utilized to obtain the motion information and reconstruct the current frames. Then two auto-encoder style neural networks are employed to compress the corresponding motion and residual information. The modules in framework 600 are jointly learned through a single loss function, in which they collaborate with each other by considering the trade-off between reducing the number of compression bits and improving quality of the decoded video. There is one-to-one correspondence between block-based video compression framework 200 shown in FIG. 2 and end-to-end deep learning based video compression framework 600 shown in FIG. 6. The relationship and brief summarization on the differences are introduced as follows. End-to-end deep learning based video compression framework 600 can include an encoder configured to generate bitstreams based on input video frames, and a decoder configured to reconstruct video frames based on the bitstreams. For simplicity, FIG. 6 only shows the encoder side of end-to-end deep learning based video compression framework 600.

As shown in FIG. 6, framework 600 can perform motion estimation and compression. In optical flow net module 601, a CNN (Convolutional Neural Network) model can be used to estimate the optical flow, which is considered as motion information $v_t$. Instead of directly encoding the raw optical flow values, an MV encoder-decoder network to compress and decode the optical flow values. Firstly, MV encoder net module 602 can be used to encode the motion information $v_t$. The encoded motion representation of motion information $v_t$ is $m_t$, which can be further quantized, by Q module 603, as $\hat{m}_t$. Then the corresponding reconstructed motion information $\hat{v}_t$ can be decoded by using MV decoder net module 604.

Framework 600 can also perform motion compensation. A motion compensation network donated as motion compensation net module 605 is designed to obtain the predicted frame $\bar{x}_t$ based on the optical flow obtained. Then, the residual $r_t$ between the original frame $x_t$ and the predicted frame $\bar{x}_t$ is obtained as $r_t = x_t + -\bar{x}_t$.

Framework 600 can also perform transform, quantization and inverse transform. The linear transform is replaced by using a highly non-linear residual encoder-decoder network, such as the residual encoder net module 606 shown in FIG. 6, and the residual $r_t$ is non-linearly mapped to the representation $y_t$. Then $y_t$ is quantized to $\hat{y}_t$ by Q module 607. In order to build an end-to-end training scheme, the quantization method is used. The quantized representation $\hat{y}_t$ is fed into the residual decoder network donated as residual decoder net module 608 to obtain the reconstructed residual $\hat{r}_t$.

Framework 600 can also perform entropy coding. At the testing stage, the quantized motion representation $\hat{m}_t$ and the residual representation $\hat{y}_t$ are coded into bits by bit rate estimation net module 609 and sent to the decoder. At the training stage, to estimate the number of bits cost, the CNNs are used to obtain the probability distribution of each symbol in $\hat{m}_t$ and $\hat{y}_t$.

Moreover, the loss of the framework 600 can be determined according to the original frame, the reconstructed frame, and the encoded frame. The loss determined here can also be used to refine the networking within the framework 600 for achieving a better performance.

Framework 600 can also perform frame reconstruction (not shown in FIG. 6), in the same way as the frame reconstruction described in connection with framework 200.

End-to-end deep learning based video compression framework 600 can be used in facial video compression, e.g., talking face generative video coding. For example, the end-to-end deep learning based talking face generative video coding can use generative models such as Variational Auto-Encoding (VAE) and Generative Adversarial Networks (GAN). The facial video compression can achieve promising performance improvement. For example, X2Face can be used to control face generation via images, audio, and pose codes. Besides, realistic neural talking head models can be used via few-shot adversarial learning. For video-to-video synthesis tasks, Face-vid2vid can be used. Moreover, schemes that leverage compact 3D keypoint representation to drive a generative model for rendering the target frame can also be used. Moreover, mobile-compatible video chat systems based on FOMM can be used. VSBNet that utilizes the adversarial learning to reconstruct origin frames from the landmarks can also be used. In addition, an end-to-end talking-head video compression framework based upon compact feature learning (CFTE), designed for high efficiency talking face video compression towards ultra low bandwidth scenarios can be used. The CFTE scheme leverages the compact feature representation to compensate for the temporal evolution and reconstruct the target face video frame in an end-to-end manner. Moreover, the CFTE scheme can be incorporated into the video coding framework with the supervision of rate-distortion objective. Although these algorithms realize frame reconstruction with a few facial parameters through the powerful rendering ability of deep generative models, some head posture movements and facial expression movements still fail to be accurately rendered compared with the original moving video.

Figure 7:
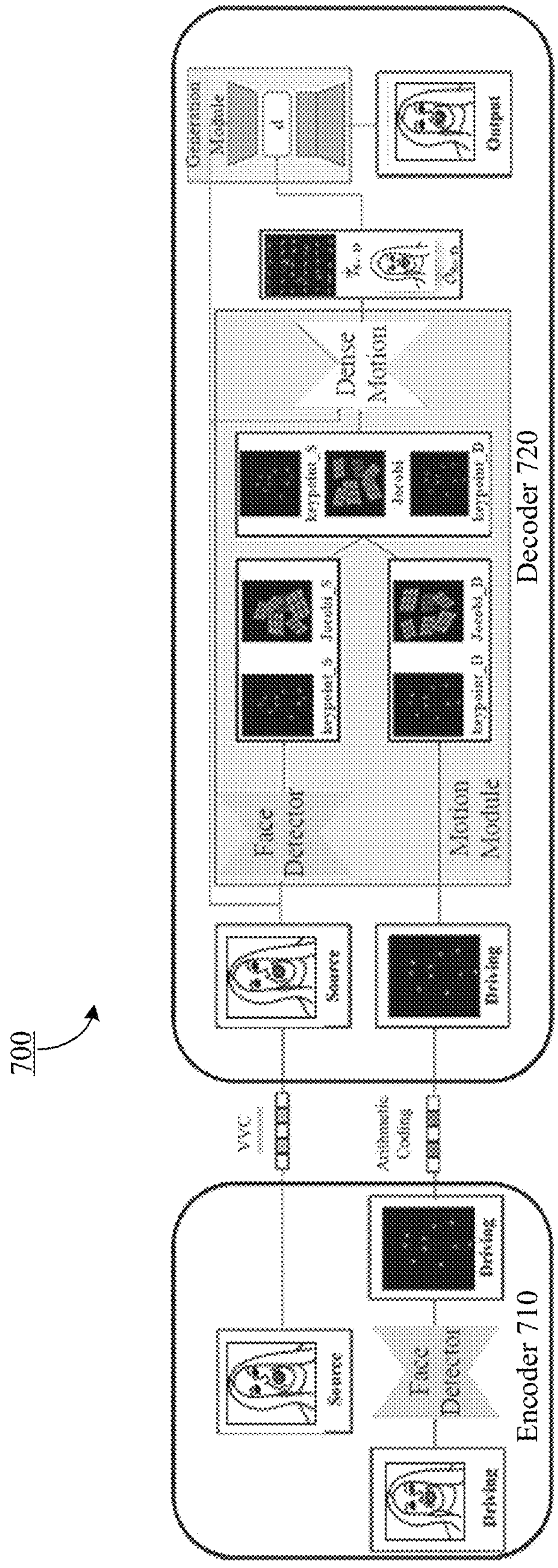
FIG. 7 is a schematic diagram illustrating an exemplary architecture of a deep learning based video generative compression framework, according to some embodiments of the present disclosure.

FIG. 7 is a schematic diagram illustrating an exemplary deep learning based video generative compression framework 700, according to some embodiments of the present disclosure. Framework 700 is suitable for compressing and generating talking face videos. For example, framework 700 can be based on the First Order Motion Model (FOMM). The FOMM deforms a reference source frame to follow the motion of a driving video. While this method works on various types of videos (for example, motion pictures, cartoons), this method can also be used for face animation applications. FOMM follows an encoder-decoder architecture with a motion transfer component including the following steps.

Firstly, a keypoint extractor (also referred to as a motion module) is learned using an equivariant loss, without explicit labels. By this keypoint extractor, two sets of ten learned keypoints are computed for the source and driving frames. The learned keypoints are transformed from the feature map with the size of channel×64×64 via the Gaussian map function, thus every corresponding keypoint can represent different channels feature information. It should be mentioned that every keypoint is point of (x, y) that can represent the most important information of feature map.

Secondly, a dense motion network uses the landmarks and the source frame to produce a dense motion field and an occlusion map.

Then, the encoder 710 encodes the source frame via the traditional image/video compression method, such as HEVC/VVC or JPEG/BPG. Here, the VVC is used to compress the source frame.

In the later stage, the resulting feature map is warped using the dense motion field (using a differentiable grid-sample operation), then multiplied with the occlusion map.

Lastly, the decoder 720 generates an image from the warped map.

Figure 8:
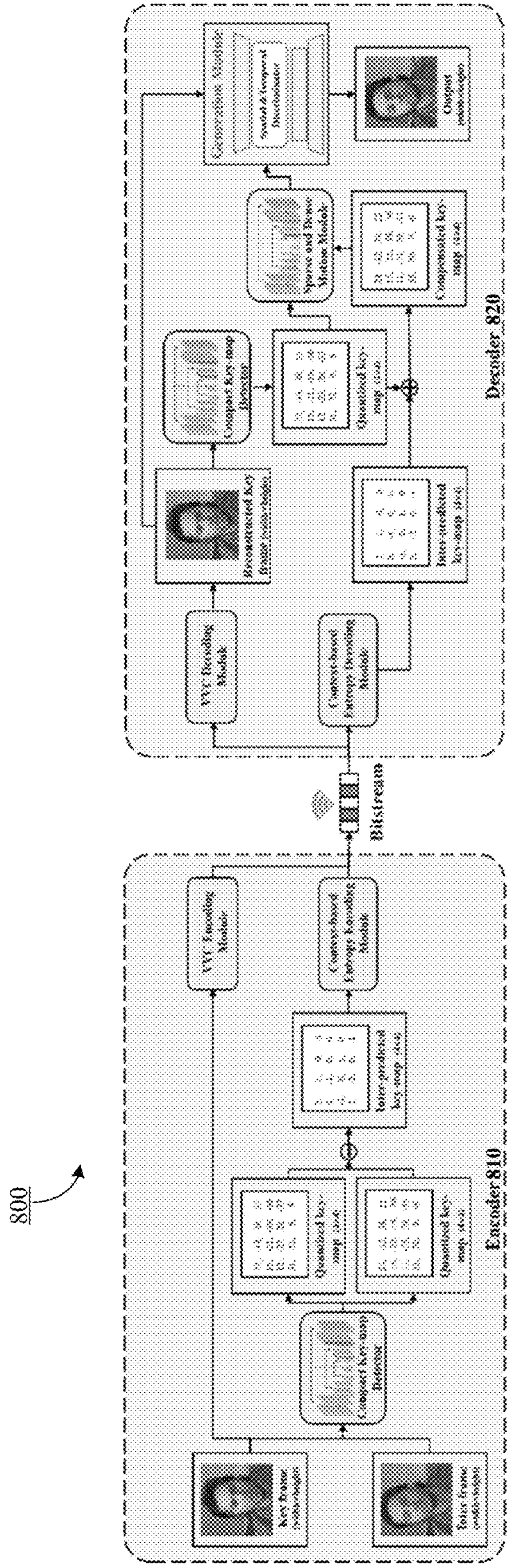
FIG. 8 is a schematic diagram illustrating an exemplary encoder-decoder coding framework with the 1×4×4 compact feature size for a talking face video, according to some embodiments of the present disclosure.

FIG. 8 is a schematic diagram illustrating an exemplary encoder-decoder coding framework 600 with the 1×4×4 compact feature size for a talking face video, according to some embodiments of the present disclosure. FIG. 8 provides another basic framework of the deep-based video generative compression scheme based on compact feature representation, namely CFTE. It follows an encoder-decoder architecture that applies a context-based coding scheme.

At the encoder 810 side, the compression framework includes three modules: an encoder (also referred to as VVC encoding module) for compressing the key frame, a feature extractor for extracting the compact human features of the other inter frames, and a feature coding module for compressing the inter-predicted residuals of compact human features. First, the key frame that represents the human textures is compressed with the VVC encoder. Through the compact feature extractor, each of the subsequent inter frames is represented with a compact feature matrix with the size of 1×4×4. It should be mentioned that the size of compact feature matrix is not fixed, and the number of feature parameters can also be increased or decreased according to the specific requirement of bit consumption. Then, these extracted features are inter-predicted and quantized, and the residuals are finally entropy-coded as the final bitstream.

At the decoder 820 side, this compression framework also contains three main modules, including decoding for reconstructing the key frame, the reconstruction of the compact features by entropy decoding and compensation, and the generation of the final video by leveraging the reconstructed features and decoded key frame. More specifically, during the generation of the final video, the decoded key frame from the VVC bitstream can be further represented in the form of features through compact feature extraction. Subsequently, given the features from the key and inter frames, relevant sparse motion field is calculated, facilitating the generation of the pixel-wise dense motion map and occlusion map. Finally, based on deep generative model, the decoded key frame, pixel-wise dense motion map and occlusion map with implicit motion field characterization are used to produce the final video with accurate appearance, pose, and expression.

To further pursue the coding performance, numerous studies focusing on 3D face have been conducted. A 3D head model is adopted and only the pose parameters for the task of face-specific video compression are encoded. Subsequently, both Eigenspaces and Principal Component Analysis (PCA) models have been used in this task. However, based on these traditional 3D techniques, the visual quality of the reconstructed images is unacceptable. With the development of deep generative models, this 3DMM-assisted face video generation task can provide promising results.

Figure 9:
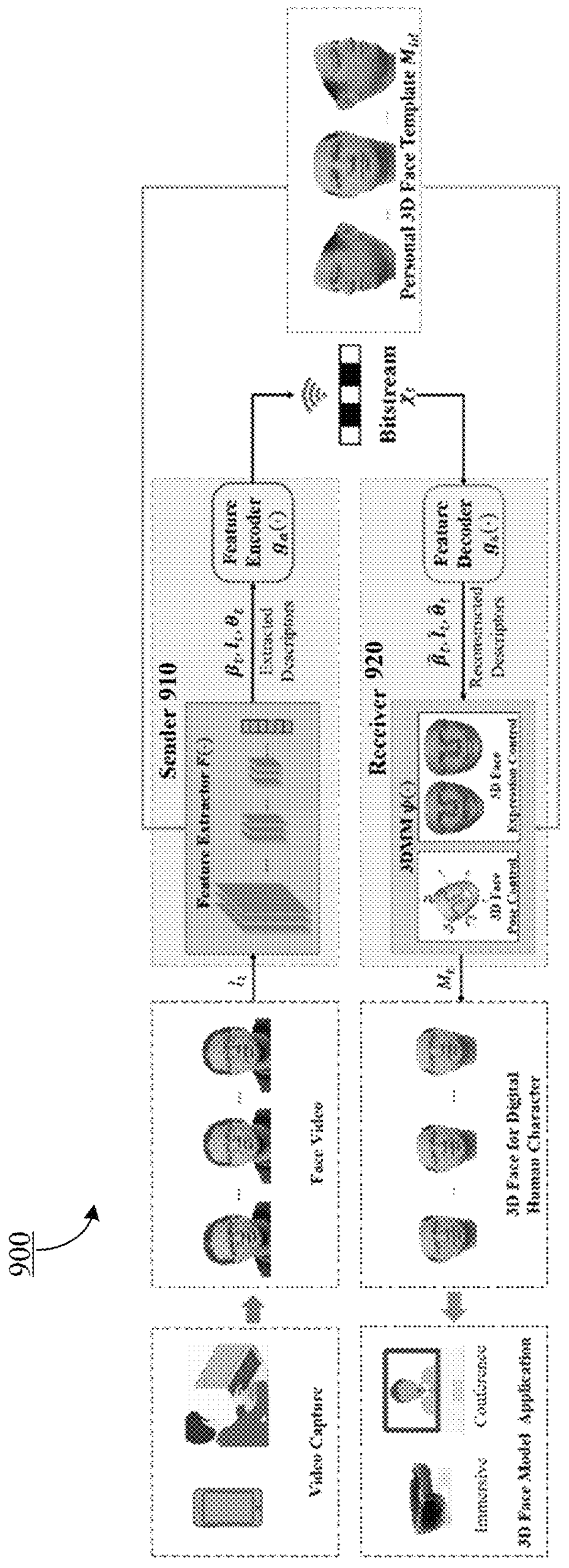
FIG. 9 is a schematic diagram illustrating a general encoder-decoder generative compression framework of 3DMM-assisted talking face video, according to some embodiments of the present disclosure.

FIG. 9 is a schematic diagram illustrating a general encoder-decoder generative compression framework 900 of 3DMM-assisted talking face video, according to some embodiments of the present disclosure. Generally speaking, the 3DMM-assisted face video generation can provide accurate 3D face reconstruction based on the combination of shape S and texture $\mathcal{T}$, which are given by:

$$\mathcal{S} = \mathcal{S}(\alpha, \beta) = \overline{\mathcal{S}} + B_{id}\alpha + B_{exp}\beta$$

$$\mathcal{T} = \mathcal{T}(\delta) = \overline{\mathcal{T}} + B_t\delta$$

where $\overline{\mathcal{S}}$ and $\overline{\mathcal{T}}$ denote average identity and texture, and the basis vectors of the identity, expression and texture space are represented with $B_{id}$, $B_{exp}$, $B_t$. The face identity, expression and texture are represented with the α, β and δ, which are corresponding feature vectors to control the reconstructed face. Furthermore, the pose and position of the 3D face are controlled by angle θ and translation l. As a result, at the encoder side (e.g., sender 910), the 3DMM parameters that serve as the feature descriptors of the 3D face are compressed. Furthermore, the decoder (e.g., receiver 920) receives the bitstream to reconstruct 3DMM template (e.g., 3D face mesh, 3D face landmark and etc.). The reconstructed 3D information from source image and driving image are used as guidance to learn the optical flow needed for the re-enacted face synthesis.

Though traditional or learning-based end-to-end video compression methods can achieve relatively high-efficiency compression performance in talking face video, directly applying common compression algorithms into ultra-low bit-rate talking face video compression system has some drawbacks.

First, the block-based hybrid coding schemes or learning-based end-to-end video compression methods designed for universal video scenarios are not able to reduce the semantic redundancy in terms of some specific scenarios exhibiting strong prior knowledge and statistical regularities. As a result, such algorithms are not suitable for ultra-low bit-rate human video compression scenes.

Secondly, the traditional or learning-based end-to-end video compression methods aim at the universal natural scenes without the specific consideration of the human motion information. In particular, these features from talking face or the moving body are described by the variations of feature structures with strong prior feature structures, such as landmarks or key points, which can greatly help to reconstruct higher quality videos.

Moreover, although the generative compression algorithms, such as FOMM or Face_vid2vid have fully realized frame reconstruction with a few parameters through the powerful rendering ability of deep generative models, some head posture movements and facial expression movements still fail to be accurately rendered compared with the original talking-face or moving-body video. That is, most of the movements based on 2D face representation (i.e., 2D landmark and 2D key-point) either perform poorly in terms of photo-realism, or fail to meet the identity preservation problem, or do not fully transfer the driving pose and expression.

Furthermore, for the existing 2D generative compression algorithms, it is not supported to include semantic information to control head movement posture in the compressed code stream, which greatly limits the application of human communication in the meta universe. On the other hand, for most of 3DMM-assisted generative models, the transmitted facial parameters have still been complex and need more compression bits, which cannot meet the ultra-low bandwidth communication scene.

To overcome the above discussed problems, the present disclosure provides a face interactive coding framework for ultra-low bitrate, highly-controllable and privacy-protected face communication. The disclosed face interactive coding paradigm follows the statistical regularities and semantic meanings of talking faces, where they are successfully projected into highly-independent and low-dimensional representations from the perspective of mouth motion, eye blinking, head posture, head translation and head location. Due to the compact facial semantic characterization, the redundancies can be greatly removed for high compression efficiency, whilst the reconstruction of talking face videos can be well developed towards controllable synthesis and friendly interaction.

Figure 10:
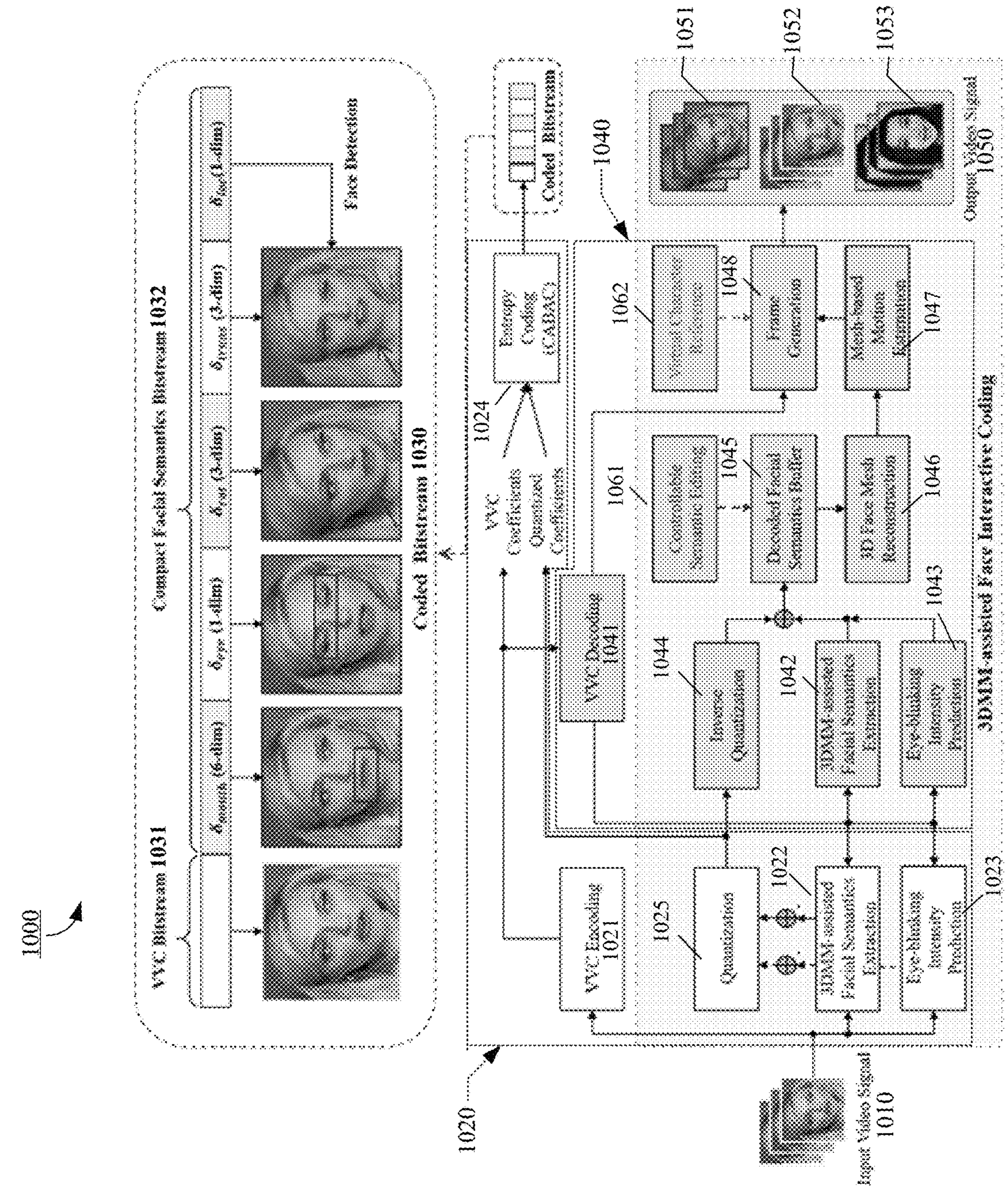
FIG. 10 illustrates an exemplary 3DMM-assisted face interactive coding framework, according to some embodiments of the present disclosure.

FIG. 10 illustrates an exemplary 3DMM-assisted face interactive coding framework 1000, according to some embodiments of the present disclosure. As shown in FIG. 10, 3DMM-assisted face interactive coding framework 1000 includes an encoder 1020 and a decoder 1040. Generally, an input video signal 1010 is encoded by encoder 1020 to generate a coded bitstream 1030, and coded bitstream 1030 is decoded by decoder 1040 to obtain an output video signal 1050. Output video signal 1050 obtained by proposed 3DMM-assisted face interactive coding framework 1000 may include three kinds of outputs: an ultra-low bitrate face communication 1051, a highly-controllable face communication 1052, and a privacy-protected face communication 1053.

Specifically, 3DMM-assisted face interactive coding framework 1000 includes three processes regarding ultra-low bitrate, highly-controllable, and privacy-protected, respectively. Input video signal 1010 is compressed by a VVC encoding module 1021 (e.g., conventional VVC codec) with a 3DMM-assisted facial semantics extraction model 1022 and an eye-blinking intensity prediction module 1023, and is encoded by an entropy coding module 1024. As shown in FIG. 10, coded bitstream 1030 obtained through encoding process by encoder 1020 may include VVC bitstream 1031 and compact facial semantics bitstream 1032. Then, a corresponding decoding process is performed to obtain a high-quality talking face video reconstruction at very low bitrate by decoder 1040. Decoder 1040 includes a VVC decoding module 1041, a 3DMM-assisted facial semantics extraction module 1042, and an eye-blinking intensity prediction module 1043, accordingly. Decoder 104 further includes a decoded facial semantics buffer 1045, a 3D face mesh reconstruction module 1046, mesh-based motion estimation module 1047, and a frame generation module 1048. In a first process, ultra-low bitrate face communication 1051 can be obtained by generating frames (e.g., by frame generation module 1048) with decoded VVC frames and motion information obtained by mesh-based motion estimation module 1047. In a second process, the face video can be further manipulated by a controllable semantic editing module 1061 for friendly interactivity. That is, facial semantics can be edited/modified before generating frames. A final face video is generated based on the edited/modified semantics with the decoded VVC frames. Therefore, highly-controllable face communication 1052 can be obtained by the second process. In a third process, a virtual character video can be simulated by animating a virtual character reference module 1062 when generating frames with facial semantics. Therefore, a privacy-protected face communication 1053 is obtained. It can be understood that quantization 1025 and inverse quantization 1044 can be also applied during the coding process.

Figure 11:
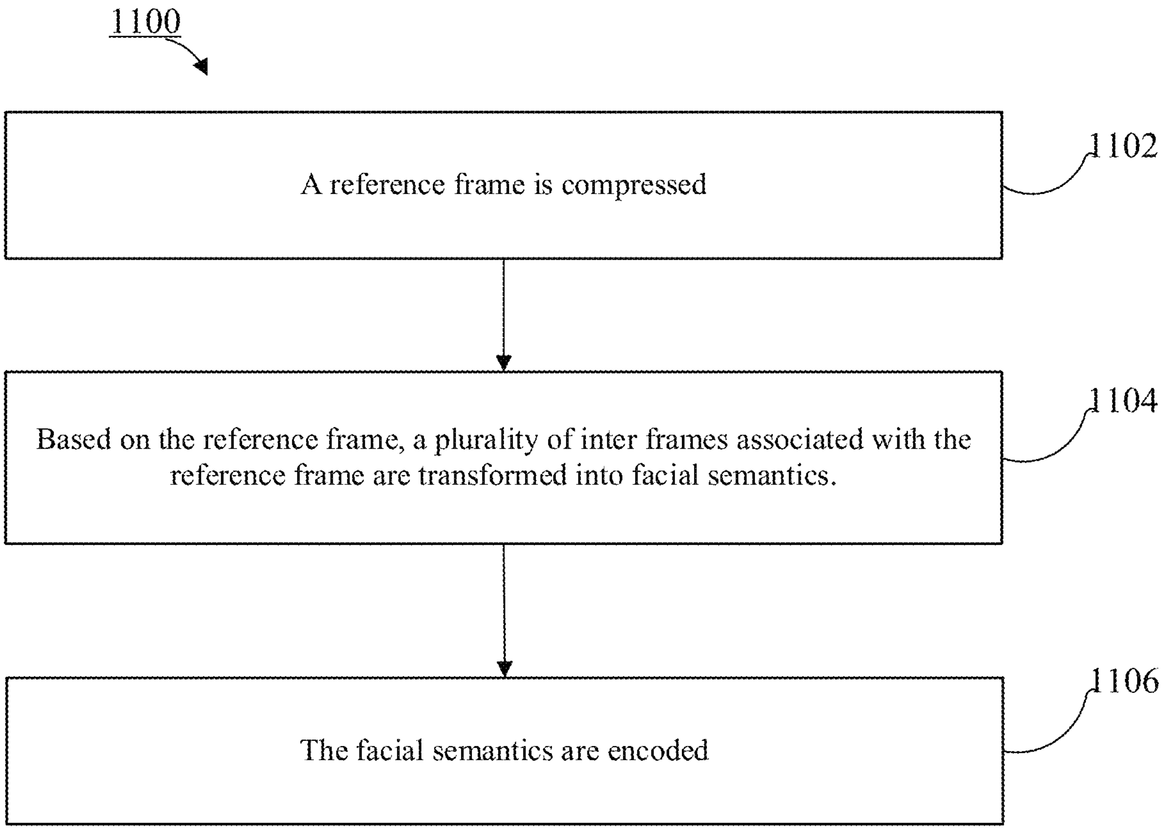
FIG. 11 is a flowchart of an exemplary method for face interactive coding, according to some embodiments of the present disclosure.

More specifically, encoder 1020 of 3DMM-assisted face interactive coding framework 1000 includes four sub-process schemes: an intra-coding scheme based upon the traditional hybrid coding framework (e.g., VVC encoding module 1021) for compressing the key-reference frame, a 3DMM-assisted compact facial semantic representation module 1022 for characterizing facial semantic meanings for inter frames, an eye-blinking prediction module 1023 for depicting eye motion status for inter frames, and a context-based encoding module 1024 for high efficiency compression by inter prediction. FIG. 11 is a flowchart of an exemplary method for face interactive coding 1100, according to some embodiments of the present disclosure. Method 1100 can be performed by an encoder (e.g., by process 400A of FIG. 4A or 400B of FIG. 4B) or performed by one or more software or hardware components of an apparatus. In some embodiments, method 1100 can be implemented by a computer program product, embodied in a computer-readable medium, including computer-executable instructions, such as program code, executed by computers. Referring to FIG. 10 and FIG. 11, method 1100 may include the following steps 1102 to 1106.

At step 1102, a reference frame is compressed. For example, a key-reference frame (i.e., the first frame) of input video signal 1010 is compressed by the block-based hybrid coding framework (i.e., VVC codec module 1021), facilitating to supplement enriched texture representation for successive frames.

At step 1104, based on the reference frame, a plurality of inter frames associated with the reference frame are transformed into facial semantics. For example, input video signal 1010 is processed by learning-based 3DMM-assisted compact facial semantic representation module 1022 and eye-blinking prediction module 1023, and the subsequent inter frames are projected into a series of facial semantics. In some embodiments, the facial semantics include head posture, face location, head translation, mouth motion and eye blinking.

At step 1106, the facial semantics are encoded. Specifically, the transformed compact facial semantics are effectively inter-predicted, quantized and entropy-coded with the context-based entropy encoding algorithm (e.g., by entropy coding module 1024).

Decoder 1040 of 3DMM-assisted face interactive coding framework 1000 also includes four sub-process schemes: decoding for reconstructing the key-reference frame, reconstruction of the compact facial semantics by entropy decoding and compensation, 3D face mesh reconstruction through the decoded facial controllable semantics, and generation of the final face video.

Figure 12:
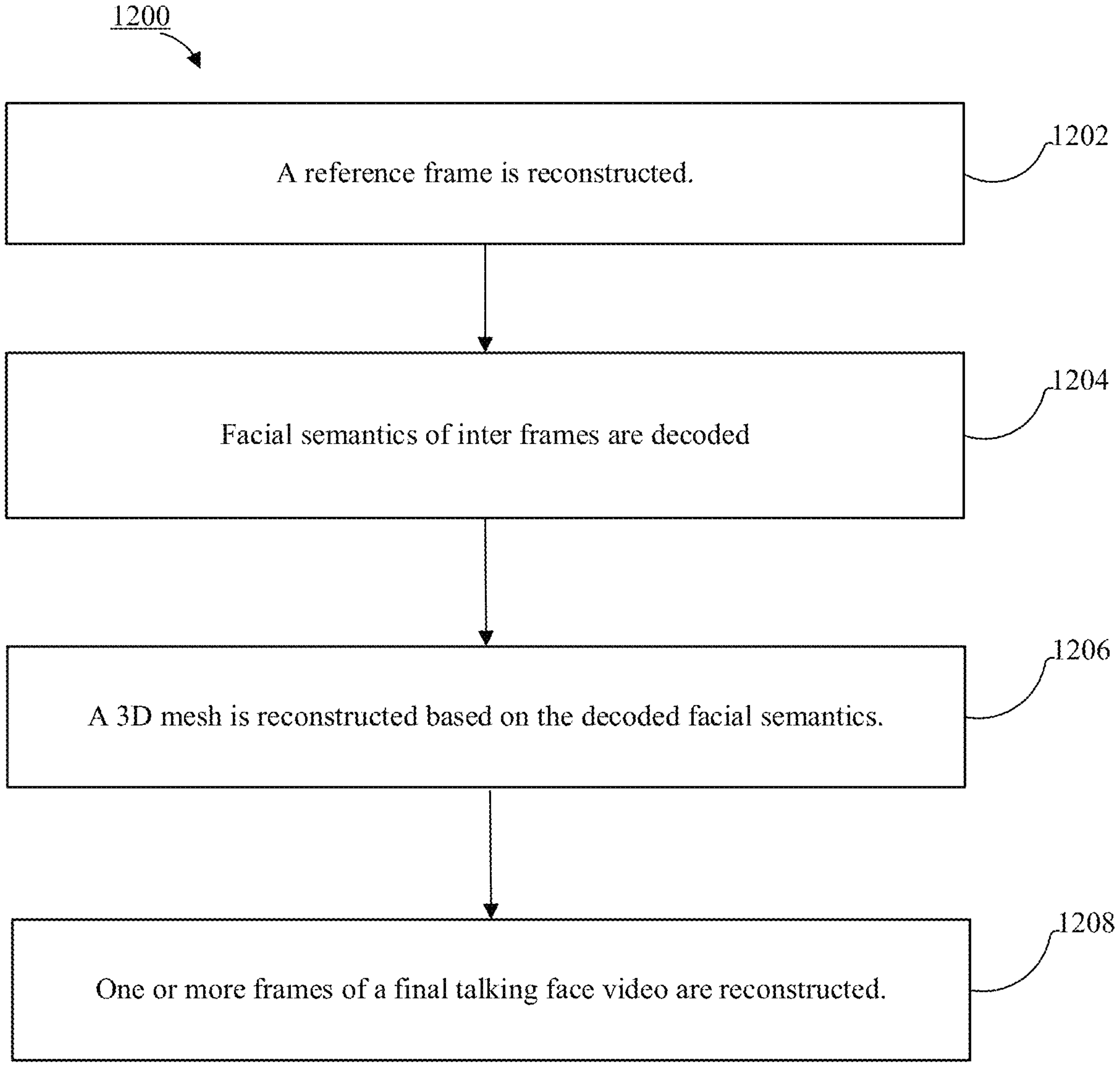
FIG. 12 is a flowchart of another exemplary method for face interactive coding, according to some embodiments of the present disclosure.

FIG. 12 is a flowchart of another exemplary method for face interactive coding 1200, according to some embodiments of the present disclosure. Method 1200 can be performed by a decoder (e.g., by process 500A of FIG. 5A or 500B of FIG. 5B) or performed by one or more software or hardware components of an apparatus. In some embodiments, method 1200 can be implemented by a computer program product, embodied in a computer-readable medium, including computer-executable instructions, such as program code, executed by computers. Referring to FIG. 10 and FIG. 12, method 1200 may include the following steps 1202 to 1206.

At step 1202, a reference frame is reconstructed. The key-reference frame is reconstructed by a VVC decoding model 1041 and facial semantics of the key-reference frame are extracted as a benchmark.

At step 1204, facial semantics of inter frames are decoded. For example, the facial semantics of inter frames are decoded by context-based entropy decoding and compensation.

At step 1206, a 3D mesh is reconstructed based on the decoded facial semantics. With the semantics of key-reference frame and inter frames, corresponding 3D face meshes can be reconstructed by 3D face mesh reconstruction module 1046 and further sent into a mesh-based motion estimation module 1047 (e.g., a designed coarse-to-dense motion field reconstruction module) for estimating a dense motion field and a facial attention map. In some embodiments, the reconstruction of 3D face meshes can be controllable by modifying the facial semantics, for example, relevant semantic parameters for the facial semantics can be modified by a controllable sematic editing module 1061, such that the posture and expression of 3D meshes are changed towards personalized characterization.

At step 1208, one or more frames of a final talking face video are reconstructed. With the reconstructed reference frame and explicit facial motion guidance (i.e., reconstructed facial semantics), the final talking face video can be reconstructed with high quality and personalized control due to the strong inference ability of the deep generative model. In some embodiments, a virtual character can be applied to the one or more frames, a 3D face mesh of the virtual character can also be reconstructed based on the semantics.

The encoding and decoding processes used in the proposed 3DMM-assisted face interactive coding framework are described in detail as follows.

In some embodiments, a process for facial semantics extraction of 3DMM-assisted face interactive coding framework 1000 is described below. A talking face having obvious structures can be further evolved into a series of facial semantic representation (i.e., identity, expression, texture, etc.) from statistical regularities of PCA-based face scans. The existing learning-based 3D face reconstruction models share an encoder-decoder architecture. The encoder usually employs the CNN backbone as the regressor to characterize a series of 3D facial semantics, whilst the 3DMM template is treated as the decoder to reconstruct face meshes. Learning-based 3D face reconstruction can economically represent face images and greatly shrink coding bits for the task of talking face video compression. In some embodiments, the facial semantics are characterized using a plurality of 3D regression parameters. Based on the pretrained 3D face reconstruction model (i.e., WM3DR), a talking face frames X, including the VVC-reconstructed key-reference frame $\hat{K}$ and subsequent original inter frames $I_l (1 \le l \le n, l \in Z)$, are regressed into the 3DMM coefficients $\delta_{reg}$, which could be described as follows:

$$\delta_{reg} = \mathcal{R}(WM3DR(X)), \qquad \text{Eq. 1}$$

$$\delta_{reg} = \{\delta_{shape}, \delta_{alb}, \delta_{illum}, \delta_{exp}, \delta_{rot}, \delta_{trans}, \delta_{loc}\}, \qquad \text{Eq. 2}$$

where $\mathcal{R}(\cdot)$ denotes the regression process of the WM3DR model, $\delta_{reg}$ represents a collection of all 3D regression parameters, including identity coefficients $\delta_{shape} \in \mathbb{R}^{80}$, albedo coefficients $\delta_{alb} \in \mathbb{R}^{80}$, scene illumination coefficients $\delta_{illum} \in \mathbb{R}^{27}$, expression coefficients $\delta_{exp} \in \mathbb{R}^{64}$, rotation coefficients $\delta_{rot} \in \mathbb{R}^{3}$, translation coefficients $\delta_{trans} \in \mathbb{R}^{3}$ and location coefficient $\delta_{loc} \in \mathbb{R}^{1}$. It should be noted that the talking face frames from the same sequence share the matched identity, albedo, and scene illumination information. Therefore, these same coefficients can be directly obtained from the 3D parameters regression process of the reconstructed key-reference frame at the decoder side, for example, for 3DMM-assisted facial semantics extraction 1042 at the decoder side. That is, the reconstructed key-reference frame can provide the subsequent inter frames with $\delta_{shape} \in \mathbb{R}^{80}$, $\delta_{alb} \in \mathbb{R}^{80}$ and $\delta_{illum} \in \mathbb{R}^{27}$ to reconstruct face meshes, which is further discussed below in connection with 3D face mesh reconstruction with FIG. 14.

In addition, for 3DMM-assisted face reconstruction (e.g., 3D face mesh reconstruction 1046), the motion of eye blinks is difficult to be captured even though expression coefficients $\delta_{exp} \in \mathbb{R}^{64}$ are used to characterize. Moreover, such 64-dimension parameters add a great burden for coding bits. To solve these problems, in some embodiments, the dimension of expression coefficients can be decreased to a dimension less than 64. For example, the dimension of expression coefficients can be decreased from 64 to 6, only representing the motion of mouth areas $\delta_{mouth} \in \mathbb{R}^{6}$. It can be understood that the expression dimension can be reduced from $\mathbb{R}^{64}$ to other dimension according to the actual requirement in terms of rate-distortion performance.

In some embodiments, a facial behaviour analysis can be employed to predict eye-blinking intensities (i.e., $\delta_{eye} \in \mathbb{R}^{1}$) for talking face frames, such that the temporal evolution of eye areas can be enhanced. For example, OpenFace, a toolkit intended for automatic facial behavior analysis and understanding can be used. As a result, each face frame can be economically represented into compact facial semantics, where these semantic coefficients of mouth motion, eye blinking, head posture, head translation and face location are highly-independent and fully-controllable. In other words, compact facial semantics $\delta_{compress}$, which actually need be compressed and transmitted for reconstructing talking face videos, are denoted as follows:

$$\delta_{compress} = \{\delta_{mouth}, \delta_{eye}, \delta_{rot}, \delta_{trans}, \delta_{loc}\}, \qquad \text{Eq. 3}$$

where $\delta_{compress}$ is a collection of compact facial semantics with the total dimension of 14. Such highly-compact and fully-disentangled facial description strategy implies the great benefits for shrinking coding bits and editing personalized face content compared with other facial feature representation methods (e.g., landmarks, keypoints, etc.).

Figure 13:
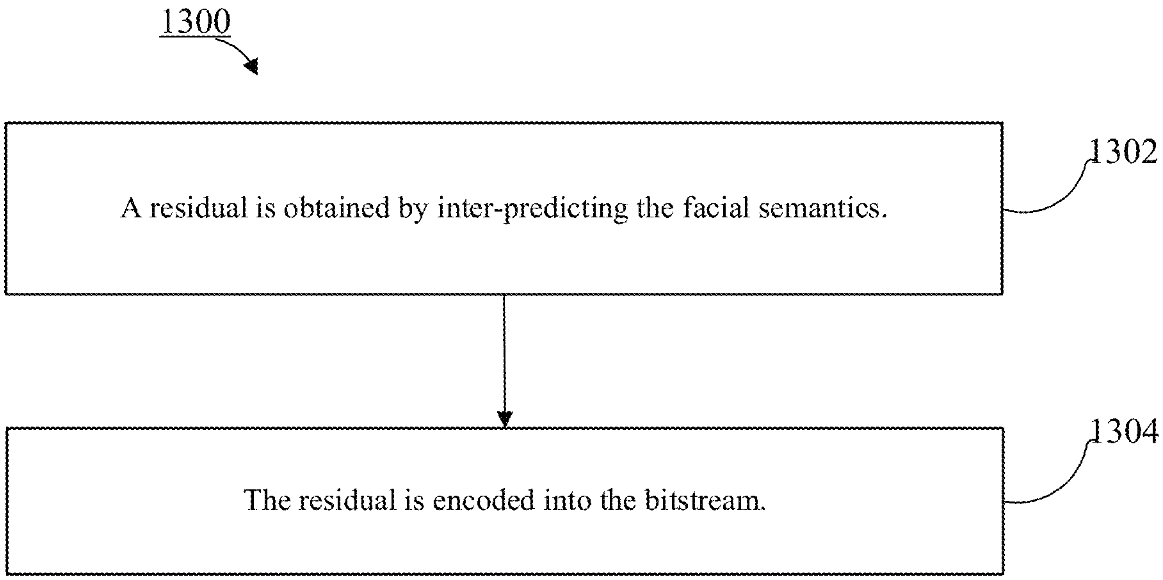
FIG. 13 illustrates a flow chart of an exemplary process for context-based entropy coding, according to some embodiments of the present disclosure.

In some embodiments, the encoding process includes facial semantics encoding. To actualize the high compression efficiency for these compact facial semantics $\delta_{compress}$, a context-based entropy coding scheme (e.g., entropy coding module 1024 in FIG. 10) is employed. FIG. 13 illustrates a flow chart of an exemplary process 1300 for context-based entropy coding, according to some embodiments of the present disclosure. As shown in FIG. 13, process 1300 includes steps 1302 and 1304.

At step 1302, a residual is obtained by inter-predicting the facial semantics. For example, these compact facial semantics characterized from talking face frames are inter-predicted to remove redundancy. The residuals $Res_{I_l}$ can be given by:

$$Res_{I_l} = \begin{cases} \delta^{J_l}_{compress} - \delta^{\hat{k}}_{compress}, & l = 1 \\ \delta^{J_l}_{compress} - \delta^{J_{l-1}}_{compress}, & l \geq 2 \end{cases}, \quad \text{Eq. 4}$$

where $$\delta^{J_{l-1}}_{compress} \text{ and } \delta^{J_l}_{compress}$$

denote compact facial semantics from the two adjacent (l−1)_th and l_th frames.

$$\delta^{\hat{k}}_{compress}$$

is compact facial semantics characterized from the VVC-reconstructed key-reference frame $\hat{K}$.

At step 1304, the residual is encoded into the bitstream. For example, these inter-predicted residuals $Res_{I_l}$ are quantized and further transformed into the bitstream. When the coding bitstream is transmitted by the communication network and received at the decoder side, the entropy decoding, inverse quantization, and frame compensation are serially executed in order to reconstruct facial semantics.

Figure 14:
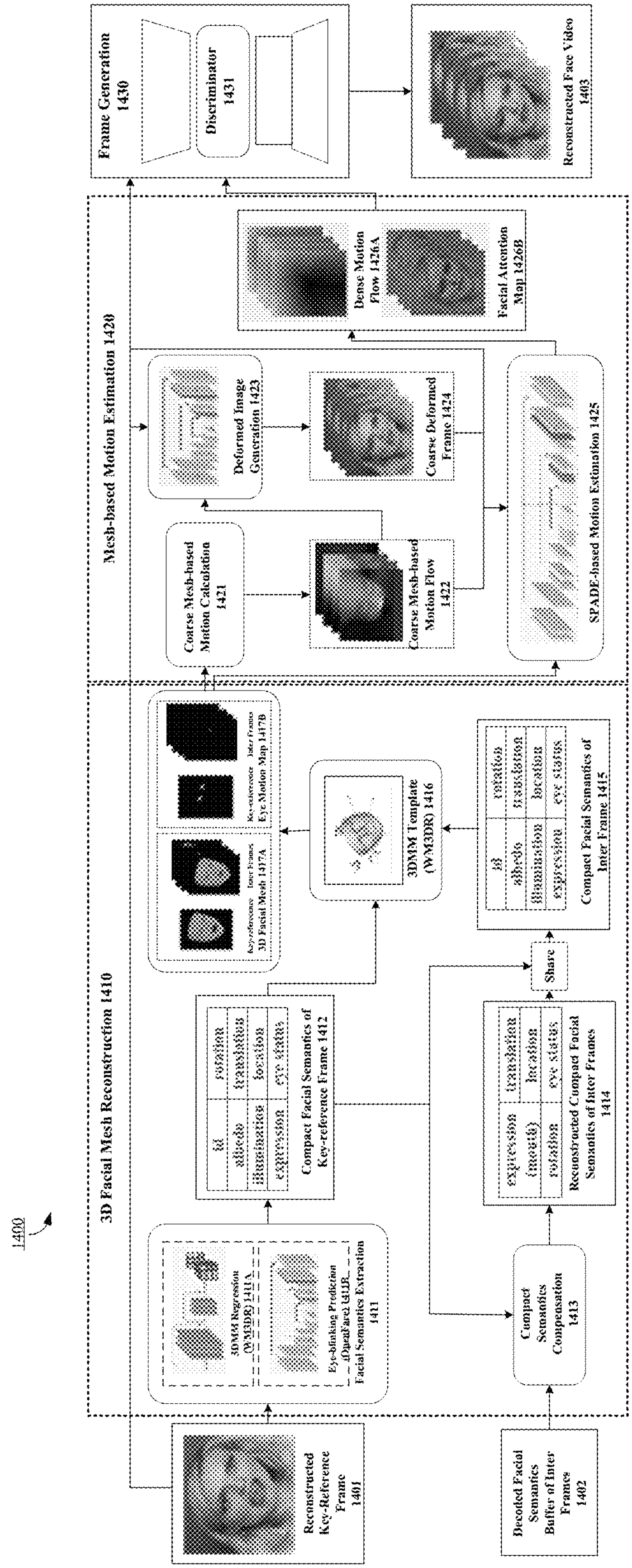
FIG. 14 illustrates an exemplary decoder framework, according to some embodiments of the present disclosure.
Figure 15:
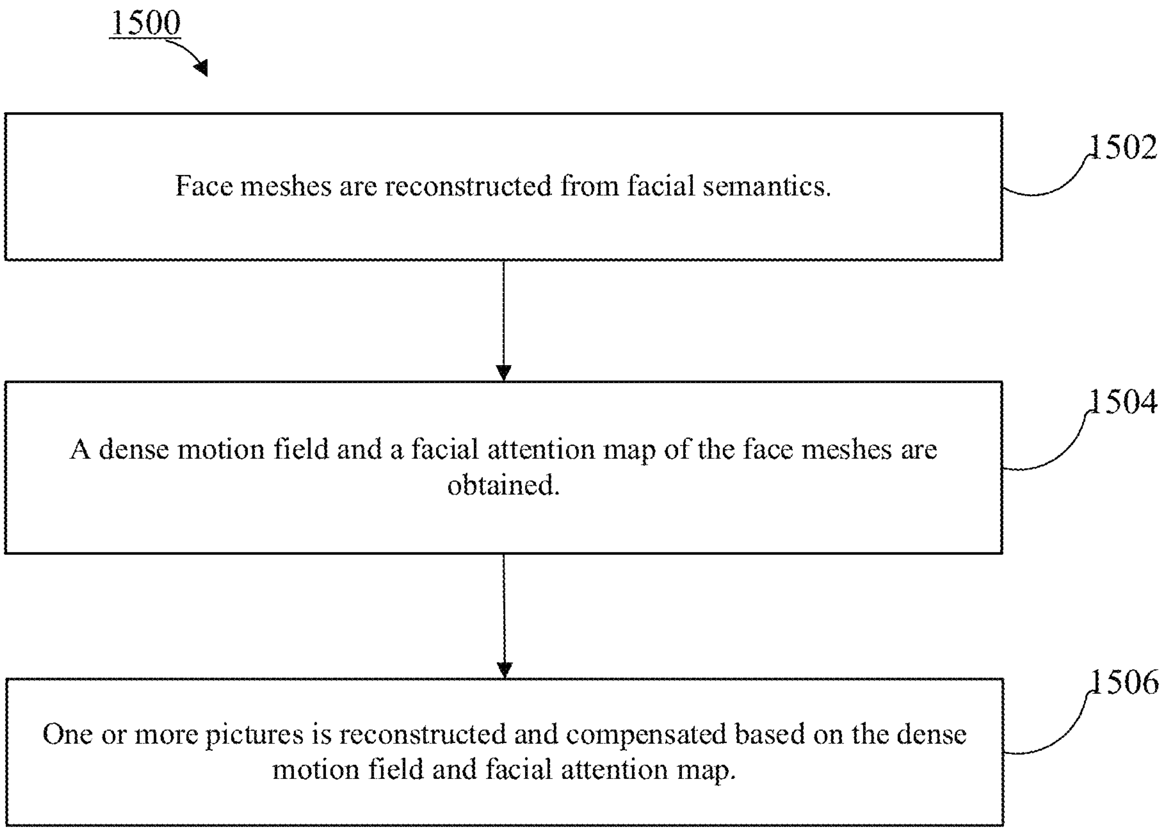
FIG. 15 illustrates a flow chart of an exemplary decoding process, according to some embodiments of the present disclosure.

FIG. 14 illustrates an exemplary decoder framework 1400, according to some embodiments of the present disclosure. As shown in FIG. 14, decoder framework 1400 includes a facial mesh reconstruction 1410 (e.g., such as 3D face mesh reconstruction 1046 of FIG. 10), mesh-based motion estimation 1420 (e.g., such as mesh-based motion estimation 1047 of FIG. 10), and frame generation 1430 (e.g., such as frame generation 1047 of FIG. 10) on a reconstructed key-reference frame 1401 and decoded compact facial semantics 1402. Decoder framework 1400 is designed to accurately reconstruct face meshes from compact facial semantic characterization and further explicitly depict the dense motion field and facial attention map. As such, a talking face video can be realistically reconstructed and perceptually compensated. FIG. 15 illustrates a flow chart of an exemplary decoding process 1500, according to some embodiments of the present disclosure. Referring to FIG. 14 and FIG. 15, decoding process 1500 includes steps 1502 to 1506.

At step 1502, face meshes are reconstructed from facial semantics, for example, by 3D facial mesh construction 1410.

At step 1504, a dense motion field and a facial attention map of the face meshes are obtained, for example, by mesh-based motion estimation 1420.

At step 1506, one or more pictures (e.g., reconstructed face video 1403) are reconstructed and compensated based on the dense motion field and facial attention map, for example, by frame generation 1430. In some embodiments, the face video is a talking face video.

Figure 16:
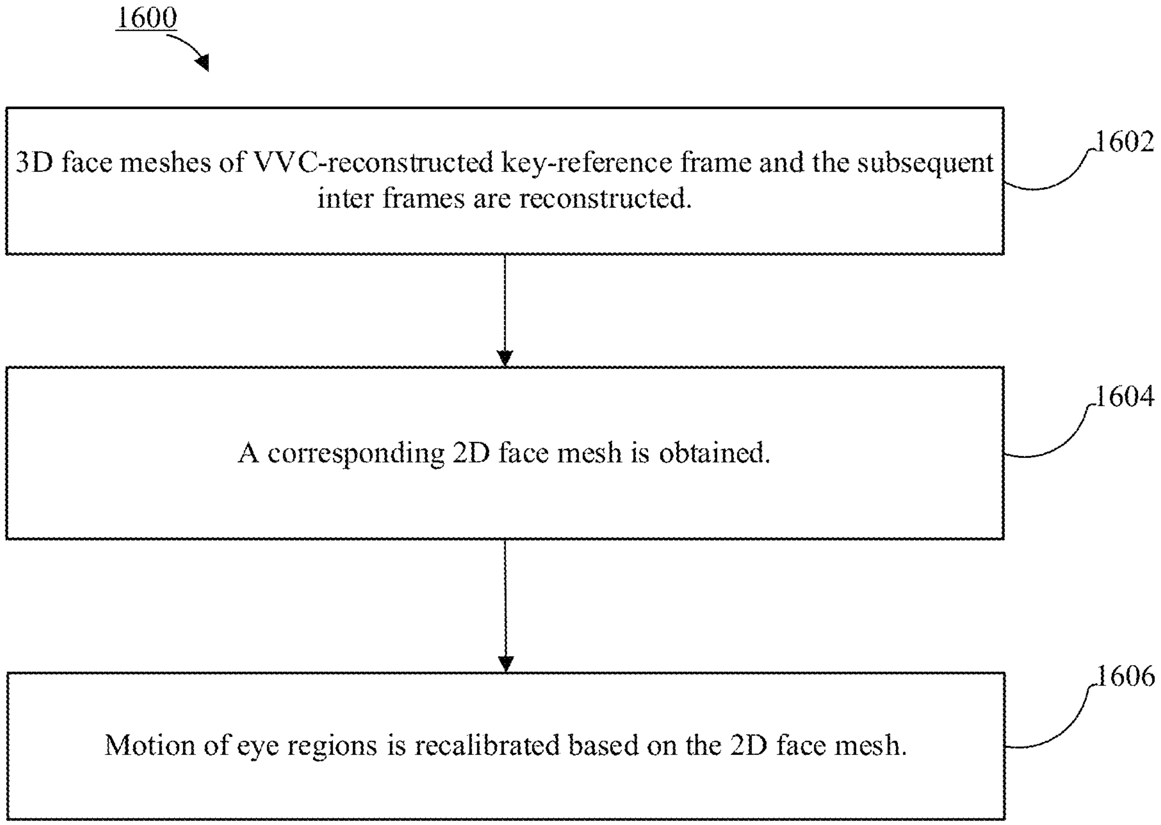
FIG. 16 illustrates a flow chart of an exemplary process for 3D face mesh reconstruction, according to some embodiments of the present disclosure.

In some embodiments, a process for 3D facial mesh reconstruction 1410 of decoder framework 1400 is described below. FIG. 16 illustrates a flow chart of an exemplary process 1600 for 3D facial mesh reconstruction, according to some embodiments of the present disclosure. Referring to FIG. 14 and FIG. 16, process 1600 includes steps 1602 to 1606.

At step 1602, 3D face meshes of VVC-reconstructed key-reference frame and the subsequent inter frames are reconstructed. Taking WM3DR model for example, the decoder of WM3DR model provides a parametric 3DMM template 1416 to synthesize 3D coordinates of face vertices given by the decoded semantic coefficients (i.e., $\hat{\delta}_{compress}$) and other semantic parameters $$\left(\text{i.e., } \delta^{\hat{K}}_{reg}\right)$$

(e.g., Compact Facial Semantics of Key-reference Frame 1412) extracted from the VVC-reconstructed key-reference frame 1401 (i.e., the first frame) (e.g., by Facial Semantics Extraction 1411) to obtain 3D facial mesh for the key-reference frame. More specifically, the key-reference frame can also be reconstructed from the VVC's bitstream at the decoder side and further input into the encoder of WM3DR to obtain the facial semantic coefficients. In addition, the talking face frames from the same sequence share the matched shape, texture, and scene illumination information, thus the facial semantics $$\left(\text{i.e., } \delta^{\hat{K}}_{shape}, \delta^{\hat{K}}_{alb} \text{ and } \delta^{\hat{K}}_{illum}\right)$$

from the VVC-reconstructed key-reference frame can assist the mesh reconstruction of subsequent inter frames. As shown in FIG. 14, parametric 3DMM template 1416 is also configured to synthesize semantic parameters of inter frames (e.g., Compact Facial Semantics of Inter Frame 1415) which can be shared from Compact Facial Semantics of Key-reference Frame 1412 to obtain 3D facial mesh for the inter frames. As such, the corresponding 3D face meshes 1417A of VVC-reconstructed key-reference frame and the subsequent inter frames can be reconstructed as follows, $$S = \overline{S} + \delta^{\hat{K}}_{shape} * S_{shape} + \delta_{exp} * S_{exp}, \quad \text{Eq. 5}$$

$$T = \overline{T} + \delta^{\hat{K}}_{alb} * T_{alb} + \delta^{\hat{K}}_{illum} * T_{illum}, \quad \text{Eq. 6}$$

where $S \in R^{3 \times N}$ and $T \in R^{3 \times N}$ are the parameterized 3D face shape and texture. In particular, $\overline{S} \in R^{3 \times N}$ and $\overline{T} \in R^{3 \times N}$ represent the average neutral shape and texture, where the number of facial vertices Nis 35,709. Besides, $S_{shape}$, $S_{exp}$, $T_{alb}$ and $T_{illum}$ denote the basis of identity, expression, albedo, and scene illumination, respectively. It should be mentioned that $\delta_{exp}$ refers to the expression coefficients $$\delta_{exp}^{K}$$

extracted from the VVC-reconstructed key-reference frame or $\hat{\delta}_{mouth}$ decoded from the bitstream.

At step 1604, a corresponding 2D face mesh is obtained. Based on parameterized 3D face shape S and texture T, 3D face vertices V can be synthesized. Then, a corresponding face mesh $\mathcal{M}$ in 2D image plane can be transformed as follows:

$$\mathcal{M} \Leftrightarrow I(RV+t), \quad \text{Eq. 7}$$

where the head rotation matrix $R \in \mathbb{R}^{3\times3}$ and the translation vector $t \in \mathbb{R}^3$ can be determined from the rotation coefficients $\delta_{rot}$ and translation coefficients $\delta_{trans}$, respectively. Besides, I is a intrinsic matrix of the global camera model that can project 3D information into 2D space.

At step 1606, motion of eye regions is recalibrated based on the 2D face mesh. After obtaining the 2D face meshes $\mathcal{M}$, the decoded eye-blinking intensities $\hat{\delta}_{eye}$ describing the eye motion status are introduced to recalibrate the motion of eye regions. The eye regions (e.g., eye-blinking prediction 1411B) of talking face frames can be located and extracted via the geometry of transformed 2D face meshes. Subsequently, the maximum vertical distance between the highest (i.e., $P_h$) and lowest point (i.e., $P_l$) for these marked regions is further changed according to the corresponding values of eye-blinking intensities. As a result, a new highest point (i.e., $P'_h$)

can be defined to recalibrate these marked regions and obtain the correct eye-blinking areas (i.e., eye-blinking motion map 1417B). This process can be formulated by:

$$P'_h = P_l - \frac{5-\hat{\delta}_{eye}}{5} \times |P_l - P_h|, \quad \text{Eq. 8}$$

where the range of intensity value $\hat{\delta}_{eye}$ is 0~5. In particular, for eye-blinking motion, the value of 0 denotes the fully-open status and the value of 5 represents the fully-closed status.

To conclude, with the decoded semantic parameter set $\hat{\delta}_{compress}=\{\hat{\delta}_{mouth}, \hat{\delta}_{eye}, \hat{\delta}_{rot}, \hat{\delta}_{trans}, \hat{\delta}_{loc}\}$, the desired face motions (i.e., expression and posture) can be accurately represented in the form of 2D face mesh $\mathcal{M}$ and eye-blinking motion map $\varepsilon$ (e.g., 1417B).

Figure 17:
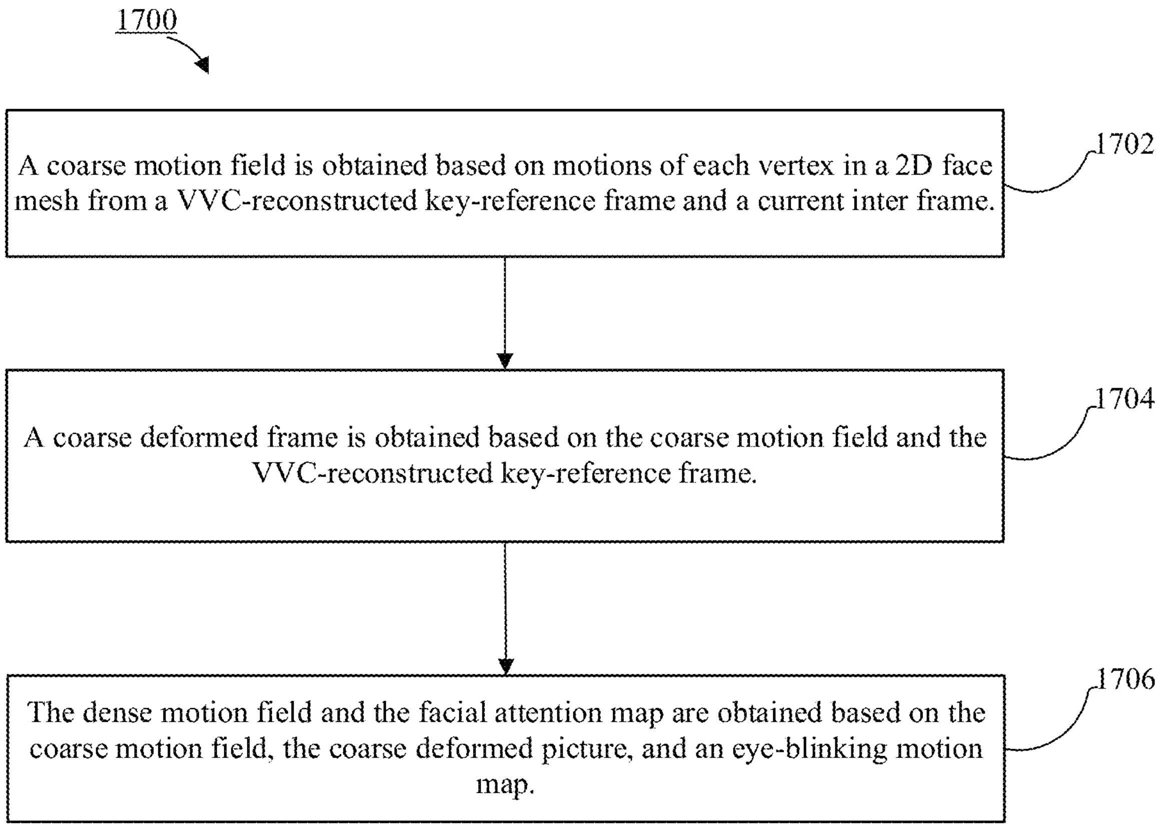
FIG. 17 illustrates a flow chart of an exemplary process for mesh-based motion estimation, according to some embodiments of the present disclosure.

In some embodiments, a process for mesh-based motion estimation 1420 of decoder framework 1400 is described below. FIG. 17 illustrates a flow chart of an exemplary process 1700 for mesh-based motion estimation, according to some embodiments of the present disclosure. Referring to FIG. 14 and FIG. 17, process 1700 includes steps 1702 and 1704.

At step 1702, a coarse motion field (e.g., coarse mesh-based motion flow 1422) is obtained based on motions of each vertex in a 2D face mesh from a VVC-reconstructed key-reference frame and a current inter frame. For example, an approximate motion of each vertex in the 2D face mesh from the VVC-reconstructed key-reference frame $\mathcal{M}_{\hat{\mathcal{K}}}$ and the current inter frame $\mathcal{M}_{\mathcal{I}_\ell}$, is estimated (e.g., coarse mesh-based motion calculation 1421). Different from FOMM that describes motion from the first order Taylor expansion in the neighborhood of learned sparse keypoints, the disclosed motion representation scheme is designed for dense face meshes with strong geometry and directly maps each vertex location in $\mathcal{M}_{\hat{\mathcal{K}}}$ with its corresponding location in $\mathcal{M}_{\mathcal{I}_\ell}$ into the 2D plane. As such, the coarse motion field $$\Gamma_{coarse}^{I_l}$$

can be estimated as follows:

$$\Gamma_{coarse}^{I_l} = G_{RID}(V_{\hat{K}} - V_{I_l}), \quad \text{Eq. 9}$$

where $V_{\hat{K}}$ and $V_{I_l}$, represent each vertex in two face meshes $\mathcal{M}_{\hat{\mathcal{K}}}$ and $\mathcal{M}_{\mathcal{I}_\ell}$, respectively. $G_{RID}(\bullet)$ means the grid data function used to interpolate the direction change of each mesh point into the 2D plane.

At step 1704, a coarse deformed frame is obtained based on the coarse motion field and the VVC-reconstructed key-reference frame. For example, the approximated coarse motion field $$\Gamma_{coarse}^{I_l}$$

(e.g., 1422) and the VVC-reconstructed key-reference frame $\hat{K}$ (e.g., 1401) are jointly input into an UNet-like encoder-decoder network (e.g., deformed image generation 1423) for obtaining a coarse deformed frame 1424

(i.e., $\mathcal{F}_{cdf}^{\mathcal{I}_\ell}$).

In particular, $\hat{K}$ is transformed into feature map via the encoder of U-Net architecture and the learned feature map has conducted the feature warping operation with $$\Gamma_{coarse}^{I_l}.$$

Then, the warped feature is further transformed into the coarse deformed frame. The specific process can be described by:

$$\mathcal{F}_{cdf}^{\mathcal{I}_\ell} = U_{Dec}\left(f_w\left(U_{Enc}(\hat{K}),\ \Gamma_{coarse}^{I_l}\right)\right), \quad \text{Eq. 10}$$

where $U_{Enc}(\bullet)$ and $U_{Dec}(\bullet)$ represent the feature learning process in the encoder and decoder of UNet architecture, and $f_w$ is the back-warping operation.

Although the coarse deformed frame $$\mathcal{F}_{cdf}^{\mathcal{J}_\ell}$$

has the similar representation with the original inter frame $I_l$ from the perspective of posture and expression, it still cannot accurately learn the details of eye motion and has a worse synthesis in realistic face.

At step 1706, the dense motion field (e.g., dense motion flow 1426A) and the facial attention map (e.g., facial attention map 1426B) are obtained based on the coarse motion field (e.g., 1421), the coarse deformed picture (e.g., 1424), and an eye-blinking motion map (e.g., 1417B). In this example, a coarse-to-fine motion estimation scheme (e.g., 1425) based on the mesh-approximated coarse motion field $$\Gamma_{coarse}^{I_l}$$

(e.g., 1421), the coarse deformed frame $$\mathcal{F}_{cdf}^{\mathcal{J}_\ell}$$

(e.g., 1424) and eye-blinking motion map ε (e.g., 1417B) is further provided. Specifically, a Spatially-Adaptive Normalization (SPADE) mechanism 1425 (i.e., SPADE(•)) is introduced to better preserve semantic information and constantly utilize these semantic information to instruct motion estimation and attention learning. Hence, the dense motion field $$\Gamma_{fine}^{I_1}$$

(e.g., 1426A) and facial attention map $$\Lambda_{facial}^{I_1}$$

(e.g., 1426B) for realistic talking face reconstruction can be obtained as follows:

$$\Gamma_{fine}^{I_l} = P_1\left(S_{PADE}\left(concat\left(\hat{K}, \varepsilon_{\hat{\mathcal{K}}}, \mathcal{F}_{cdf}^{\mathcal{J}_\ell}, \varepsilon_{\mathcal{J}_\ell}, \Gamma_{coarse}^{I_l}\right)\right)\right), \quad \text{Eq. 11}$$

$$\Lambda_{facial}^{I_l} = P_2\left(S_{PADE}\left(concat\left(\hat{K}, \varepsilon_{\hat{\mathcal{K}}}, \mathcal{F}_{cdf}^{\mathcal{J}_\ell}, \varepsilon_{\mathcal{J}_\ell}, \Gamma_{coarse}^{I_l}\right)\right)\right), \quad \text{Eq. 12}$$

where $P_1(\bullet)$ and $P_2(\bullet)$ represent two different predicted outputs, and concat(•) denotes the concatenation operation.

In some embodiments, a process for frame generation 1430 of decoder framework 1400 is described below. The strong inference capability of generative adversarial networks greatly benefits the new paradigm of face generative compression. The generative adversarial network is employed to reconstruct high-fidelity talking face video via the motion guidance information. The channel-split spatial feature transformation (i.e., CSSFT) mechanism can preserve face fidelity for reconstruction, and a CSSFT-GAN-based face reconstruction module is provided to animate the VVC-reconstructed key-reference frame $\hat{K}$ via dense motion field $$\Gamma_{fine}^{I_l}$$

and facial attention map $$\Lambda_{facial}^{I_l}.$$

Figure 18:
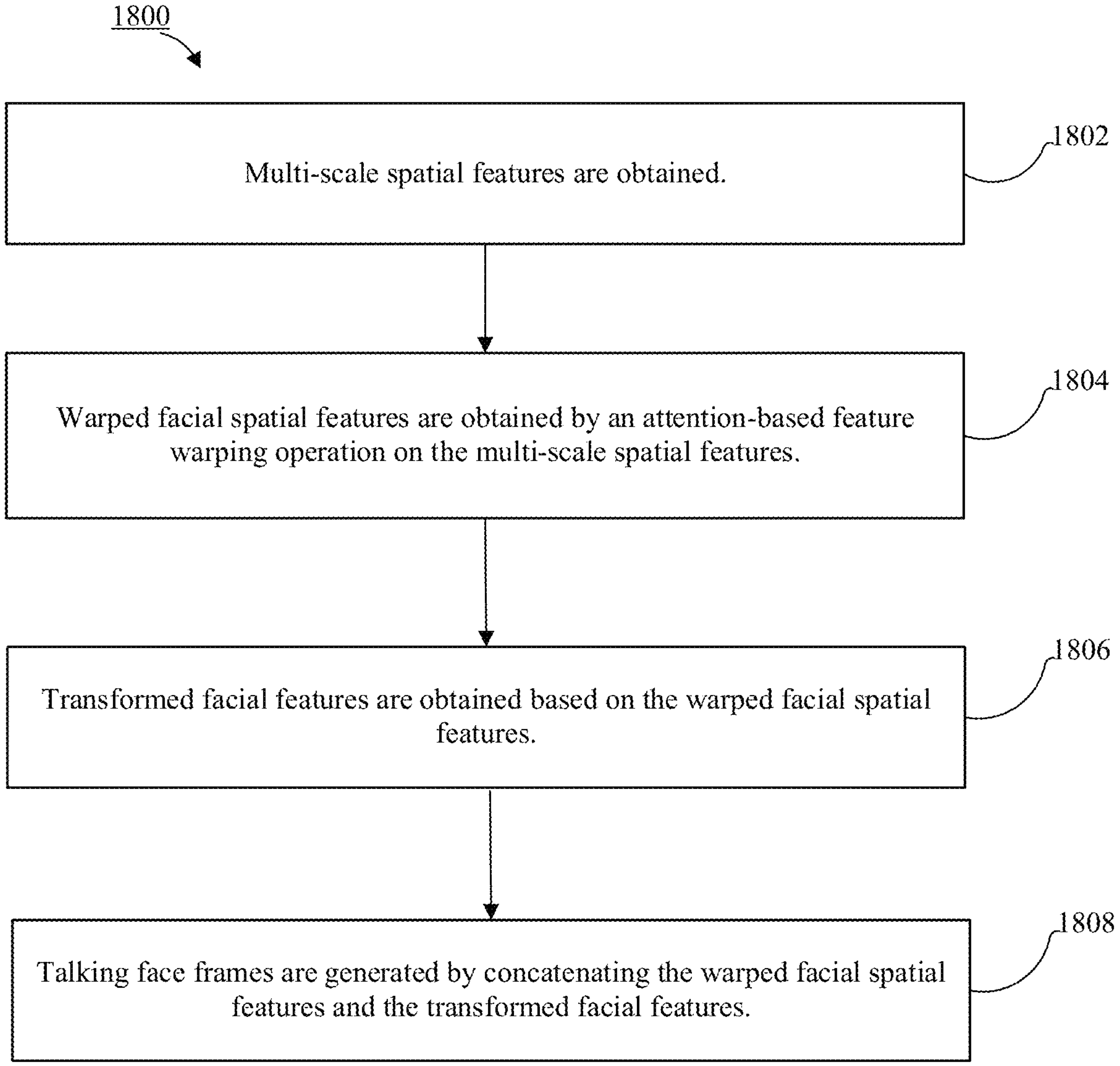
FIG. 18 illustrates a flow chart of an exemplary process for frame generation, according to some embodiments of the present disclosure.

FIG. 18 illustrates a flow chart of an exemplary process 1800 for frame generation, according to some embodiments of the present disclosure. Referring to FIG. 14 and FIG. 18, process 1800 includes steps 1802 to 1808.

At step 1802, multi-scale spatial features are obtained. For example, the VVC-reconstructed key-reference frame $\hat{K}$ (e.g., 1401) is fed into the encoder of UNet (e.g., 1423) to obtain multi-scale spatial features $$F_{spatial}^{\hat{K}}.$$

At step 1804, warped facial spatial features are obtained by an attention-based feature warping operation on the multi-scale spatial features. Specifically, the dense motion field $$\Gamma_{fine}^{I_l}$$

(e.g., 1426A) and facial attention map $$\Lambda_{facial}^{I_l}$$

(e.g., 1426B) are further employed to achieve an attention-based feature warping operation for these multi-scale spatial features $$F_{spatial}^{\hat{K}}.$$

thus the warped facial spatial features $$F_{warp}^{I_l}$$

can be denoted as follows:

$$F_{warp}^{I_l} = \Lambda_{facial}^{I_l} \odot f_w\left(F_{spatial}^{\hat{K}}, \Gamma_{fine}^{I_l}\right), \quad \text{Eq. 13}$$

where $f_w$ and ⊙ denote the back-warping operation and the Hadamard product, respectively.

At step 1806, transformed facial features are obtained based on the warped facial spatial features. Specifically, the warped result is conveyed into the CSSFT-based face generation module (e.g., frame generation 1430), where a pair of affine transformation parameters (i.e., scaling α and shifting $\beta$) can be produced from each resolution scale spatial feature $$F^{\hat{K}}_{spatial}$$

via the convolutional layers. Furthermore, the learned scaling $\alpha$ and shifting $\beta$ parameters are used to modulate the warped facial spatial features scaling $\alpha$ and shifting $\beta$, facilitating to output the transformed facial features $$F^{J_1}_{trans}$$

as follows:

$$F^{J_l}_{trans} = \alpha \odot F^{J_l}_{warp} + \beta. \quad \text{Eq. 14}$$

At step 1808, talking face frames (e.g., reconstructed face video 1403) are generated by concatenating the warped facial spatial features and the transformed facial features. For example, $$F^{J_l}_{warp} \text{ and } F^{J_l}_{trans}$$

are concatenated to perform the generation of talking face frames $\hat{I}_l$ that can enjoy the benefits of reconstruction realness and identity. The specific process is formulated by, $$\hat{I}_l = G_{frame}\left(concat\left(F^{J_l}_{warp}, F^{J_l}_{trans}\right)\right), \quad \text{Eq. 15}$$

where $G_{frame}$ denotes the subsequent network layers of generator. Finally, the multi-scale feature discriminator 1431 is utilized to guarantee that each generated face frame $\hat{I}_l$ has a realistic reconstruction with the supervision of ground-truth image.

Model supervision and loss functions used in the disclosed 3DMM-assisted face interactive coding framework are further described. In the disclosed 3DMM-assisted face interactive coding framework, perceptual loss $L_{per}$, adversarial loss $L_{adv}$, id preserving loss $L_{id}$, and reconstruction texture loss $L_{tex}$ can be adopted to supervise the end-to-end training process. It should be noted that these related loss functions do not need to be used together and they can be combined according to the actual task needs.

To summarize, the overall end-to-end training loss is given by:

$$L_{total} = \lambda_{initial} L_{per-initial} + \lambda_{final} L_{per-final} + \lambda_{adv} L_{adv} + \lambda_{id} L_{id} + \lambda_{tex} L_{tex},$$

where $\lambda_{initial}$ and $\lambda_{final}$ are both set to 10. $\lambda_{adv}$, $\lambda_{id}$ and $\lambda_{tex}$ are equal to 1, 40, and 100, respectively. Notedly, for these values of $\lambda$, they are set via empirical experiments. Other reasonable values also be considered to obtain a better training model.

The disclosed 3DMM-assisted face interactive coding framework has various extended applications. The disclosed 3DMM-assisted face interactive coding framework can control head movement posture and facial expression in the compressed code stream, which can further be applied into ultra-low bandwidth face video conference, human communication in the meta universe, virtual uploader for live commerce, etc. The value of semantic parameter set $\hat{\delta}_{compress}$, including mouth motion, eye blinking, head posture and head translation can be changed, thus the pseudo driving face mesh can be retargeted. And finally, semantic parameter set $\hat{\delta}_{compress}$ together with key-frame mesh is input into the motion estimation module and frame generation to reconstruct face image with a novel posture and expression, reflecting the adjusted parameters. The specific application scenarios can be further illustrated as follows.

"Ultra-low bandwidth face video conference:" recently, a demand in video conferencing/chat is dramatically increased. The disclosed 3DMM-assisted generative compression framework has fully exploited the strong statistical regularities of face videos and just compressed 3D compact parameters to achieve face video reconstruction for end-users towards ultra-low bitrate.

"Face communication in the meta universe:" Metaverse is a virtual world and a digital living space constructed by human using digital technology, which is mapped or surpassed by the real world, and can interact with the real world. Human character communication is very important for this new social system. The disclosed 3DMM-assisted generative compression framework can effectively achieve human parameter transfer and human character reconstruction. To be specific, the extracted pose information and facial parameters in the 3DMM template can be used to render the corresponding face meshes, and the relevant motion information can be learned from these meshes and directly transfer into the specific human character. It is certain that the communication bitrate keeps stable like face video conference.

"Virtual character for live entertainment:" With the rise of domestic live broadcast demand, virtual commerce characters seem to be on the fast track of development and become a new trend of live broadcast delivery. Virtual character for live commerce can provide better freshness and attract more customers into the live room, while retaining the interactivity of a real person. With the rise of young groups, the world of the second dimension is also more attractive. Therefore, the disclosed scheme also can be applied in this area, whilst it can reduce the burden of network bandwidth with a number of customers if they are in the live room at the same time.

Figure 19:
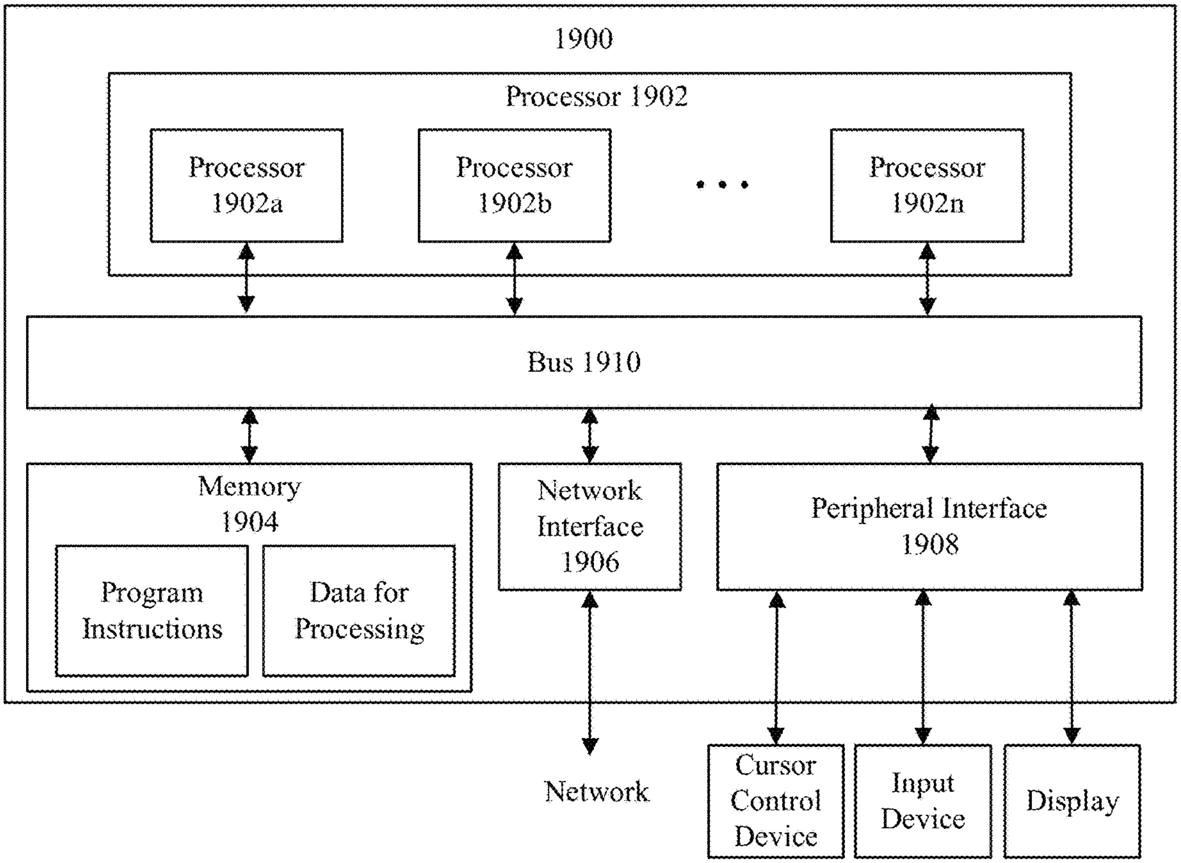
FIG. 19 is a block diagram of an exemplary apparatus for coding image data, according to some embodiments of the present disclosure.

FIG. 19 is a block diagram of an exemplary apparatus 1900 for coding image data, according to some embodiments of the present disclosure. Apparatus 1900 can be used to perform the above-described video compression methods. As shown in FIG. 19, apparatus 1900 can include processor 1902. When processor 1902 executes instructions described herein, apparatus 1900 can become a specialized machine for video encoding or decoding. Processor 1902 can be any type of circuitry capable of manipulating or processing information. For example, processor 1902 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 1902 can also be a set of processors grouped as a single logical component. For example, as shown in FIG. 19, processor 1902 can include multiple processors, including processor 1102*a*, processor 1902*b*, and processor 1902*n*.

Apparatus 1900 can also include memory 1904 configured to store data (e.g., a set of instructions, computer codes, intermediate data, or the like). For example, as shown in FIG. 19, the stored data can include program instructions (e.g., program instructions for implementing the methods described in the present disclosure. Processor 1902 can access the program instructions and data for processing (e.g., via bus 1910), and execute the program instructions to perform an operation or manipulation on the data for processing. Memory 1904 can include a high-speed random-access storage device or a non-volatile storage device. In some embodiments, memory 1904 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 1904 can also be a group of memories (not shown in FIG. 19) grouped as a single logical component.

Bus 1910 can be a communication device that transfers data between components inside apparatus 1900, such as an internal bus (e.g., a CPU-memory bus), an external bus (e.g., a universal serial bus port, a peripheral component interconnect express port), or the like.

For ease of explanation without causing ambiguity, processor 1902 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 1900.

Apparatus 1900 can further include network interface 1906 to provide wired or wireless communication with a network (e.g., the Internet, an intranet, a local area network, a mobile communications network, or the like). In some embodiments, network interface 1906 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, apparatus 1900 can further include peripheral interface 1908 to provide a connection to one or more peripheral devices. As shown in FIG. 19, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs consistent with the present disclosure can be implemented as any combination of any software or hardware modules in apparatus 1900. For example, some or all stages of the disclosed methods can be implemented as one or more software modules of apparatus 1900, such as program instructions that can be loaded into memory 1904. For another example, some or all stages of the disclosed methods can be implemented as one or more hardware modules of apparatus 1900, such as a specialized data processing circuit (e.g., an FPGA, an ASIC, an NPU, or the like).

In some embodiments, a non-transitory computer-readable storage medium storing a bitstream is also provided. The bitstream can be encoded and decoded according to the above-described method of face interactive coding. For example, the bitstream can include an encoded reference frame, and encoded facial semantics of a plurality of inter frames, wherein the facial semantics are determined based on the reference frame and the plurality of inter frames. The encoded reference frame and encoded facial semantics can be decoded and used to generate one or more pictures based on the above-described methods, e.g., method 1200 (FIG. 12).

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It is noted that the embodiments described in the present disclosure can be freely combined or used separately.

In summary, the above described face interactive coding framework has the following technical features.

The disclosed interactive coding framework for talking face videos can warrant the service of immersive video conferencing and metaverse-related activities. Different from the existing face controllable manipulation before the video encoding or after the video decoding with high complexity/delay, the disclosed framework is unified and flexible so that it does not impose additional complexity/delay. Specifically, the disclosed scheme can directly characterize the talking face frames into highly-disentangled facial semantics and manipulate them into the coding bitstream. As such, the disclosed scheme enjoys the advantages of low complexity without extra manipulation, promising rate-distortion performance and vivid face character animation.

The disclosed transmitted coding bitstream provided an improved compact representation and semantic interpretation. First, compared with the block-based video compression and feature-based end-to-end video compression, only the talking face frame with a 14-dimension facial semantic parameter are characterized according to the present disclosure, thereby greatly facilitating the ultra-low bitrate (e.g., 2~4 kbps) face video communication. Moreover, the disclosed coding bitstream definite semantic meanings in terms of mouth motion, eye blinking, head posture and head translation, which can benefit to edit facial semantics for interactivity or transfer facial semantics into a virtual character for user-privacy.

Based on the above described mesh-based motion estimation module (e.g., mesh-based motion estimation module 1047 shown in FIG. 10) and frame generation module (e.g., frame generation module 1048 shown in FIG. 10), the face meshes reconstructed by 3DMM template can be better evolved into dense motion field and facial guidance map for pixel-wise face generation.

The proposed framework are different from the existing face generative compression algorithms, such as FOMM and Face_vid2vid, where they describe motion from the first order Taylor expansion in the neighborhood of learned sparse keypoints. By contrast, the disclosed motion representation scheme is designed for dense face meshes with strong geometry and directly maps each vertex location in with its corresponding location at the 2D plane. As such, the corresponding facial semantics can be easily edited so that the 3D face meshes can be developed towards personalized characterization.

Moreover, compared with these generation algorithms that only employ the hourglass network to achieve feature warping, the disclosed interactive coding framework provides a GAN-based face reconstruction module with the channel-split spatial feature transformation mechanism. As such, face fidelity can be well preserved during the face reconstruction.

Finally, the disclosed framework can support ultra-low bandwidth face video conference, face interactive communication in the meta universe and virtual character for live entertainment.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method of encoding a video sequence into a bitstream, the method comprising:
- receiving a video sequence;
- encoding one or more pictures of the video sequence; and
- generating a bitstream, wherein the encoding comprises:
  - compressing a reference picture;
  - transforming, based on the reference picture, a plurality of inter pictures associated with the reference picture into facial semantics; and
  - encoding the facial semantics;
- wherein encoding the facial semantics further comprises:
  - obtaining a residual by inter-predicting the facial semantics; and
  - encoding the residual into the bitstream.

2. The method according to claim 1, wherein the video sequence comprises a talking face video.

3. The method according to claim 1, wherein transforming, based on the reference frame, the plurality of inter pictures associated with the reference picture into facial semantics further comprises:
- characterizing the facial semantics using a plurality of three-dimensional (3D) regression parameters.

4. The method according to claim 3, wherein the plurality of 3D regression parameters comprises: identity coefficients, albedo coefficients, scene illumination coefficients, expression coefficients, rotation coefficients, translation coefficients, and location coefficient.

5. The method according to claim 4, wherein a dimension of the expression coefficients is less than 64.

6. The method according to claim 5, wherein the dimension of the expression coefficients is 6, and the expression coefficients represent motion of mouth area.

7. The method according to claim 1, wherein the facial semantics are descriptive of one or more of:
- a head posture, a face location, a head translation, a mouth motion, or eye blinking.

8. The method according to claim 7, wherein an eye-blinking intensity is predicted using facial behaviour analysis.

9. A non-transitory computer readable storage medium storing a bitstream of a video, the bitstream comprising:
- an encoded reference picture;
- encoded facial semantics of a plurality of inter frames, wherein the facial semantics are determined based on the reference frame and the plurality of inter frames; and
- a residual obtained by inter-predicting the facial semantics.

10. The non-transitory computer readable storage medium according to claim 9, wherein the facial semantics are descriptive of one or more of:
- a head posture, a face location, a head translation, a mouth motion, or eye blinking.

11. A method for transmitting a bitstream, the method comprising:

receiving a video sequence;

encoding the video sequence by compressing a reference picture;

transforming, based on the reference picture, a plurality of inter pictures associated with the reference picture into facial semantics;

encoding the facial semantics;

obtaining a residual by inter-predicting the facial semantics; and encoding the residual;

transmitting the bitstream that is generated based on the encoding.

12. The method according to claim 11, wherein the video sequence comprises a talking face video.

13. The method according to claim 11, wherein transforming, based on the reference frame, the plurality of inter pictures associated with the reference picture into facial semantics further comprises:

characterizing the facial semantics using a plurality of three-dimensional (3D) regression parameters.

14. The method according to claim 13, wherein the plurality of 3D regression parameters comprises: identity coefficients, albedo coefficients, scene illumination coefficients, expression coefficients, rotation coefficients, translation coefficients, and location coefficient.

15. The method according to claim 14, wherein a dimension of the expression coefficients is less than 64.

16. The method according to claim 15, wherein the dimension of the expression coefficients is 6, and the expression coefficients represent motion of mouth area.

17. The method according to claim 11, wherein the facial semantics are descriptive of one or more of:

a head posture, a face location, a head translation, a mouth motion, or eye blinking.

18. The method according to claim 17, wherein an eye-blinking intensity is predicted using facial behaviour analysis.

* * * * *